(12) United States Patent
Amit et al.

(10) Patent No.: US 7,657,450 B2
(45) Date of Patent: Feb. 2, 2010

(54) RELIABLE, SECURE AND SCALABLE INFRASTRUCTURE FOR EVENT REGISTRATION AND PROPAGATION IN A DISTRIBUTED ENTERPRISE

(75) Inventors: Neta J. Amit, Haifa (IL); Alexander Frank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 09/733,522

(22) Filed: Dec. 8, 2000

(65) Prior Publication Data

US 2002/0116248 A1    Aug. 22, 2002

(51) Int. Cl.
G06F 9/44 (2006.01)
G06F 17/50 (2006.01)
G06Q 10/00 (2006.01)
G06Q 30/00 (2006.01)

(52) U.S. Cl. .............................................. 705/7; 705/1
(58) Field of Classification Search ...................... 705/9; 707/4, 5; 709/101, 102, 203, 223, 224, 225; 719/318
See application file for complete search history.

(56) References Cited

U.S. PATENT DOCUMENTS

| | | | |
|---|---|---|---|
| 4,956,800 A * | 9/1990 | Kametani | 708/524 |
| 5,321,837 A * | 6/1994 | Daniel et al. | 707/4 |
| 5,980,096 A * | 11/1999 | Thalhammer-Reyero | 707/100 |
| 6,185,611 B1 * | 2/2001 | Waldo et al. | 709/221 |
| 6,202,089 B1 * | 3/2001 | Juster | 709/219 |
| 6,236,996 B1 * | 5/2001 | Bapat et al. | 707/9 |
| 6,430,616 B1 * | 8/2002 | Brinnand et al. | 709/224 |
| 6,438,705 B1 * | 8/2002 | Chao et al. | 714/4 |
| 6,598,067 B1 * | 7/2003 | Wydra et al. | 709/100 |
| 6,604,093 B1 * | 8/2003 | Etzion et al. | 706/47 |
| 6,631,363 B1 * | 10/2003 | Brown et al. | 707/1 |
| 6,658,485 B1 * | 12/2003 | Baber et al. | 719/314 |

\* cited by examiner

Primary Examiner—F. Zeender
Assistant Examiner—Asfand M Sheikh
(74) Attorney, Agent, or Firm—Capital City TechLaw; Richard C. Irving

(57) ABSTRACT

A trigger engine and infrastructure for event registration and handling that is reliable, secure and scalable. Transactional authenticated and/or encrypted messages (e.g., via MSMQ) are used to transport events across each server. A stable recovery mechanism is provided wherein the recovery path is nearly identical to the normal path. A trigger engine may concentrate multiple similar requests into a single base request for event notification, and upon receipt of the base event, access tables maintained in the trigger engine to track which client registered for which type of notification. In this manner, only the base event request is registered remotely, reducing the number of events that need to be communicated to remote servers. Identical event requests from clients may also be concentrated into a base event request, and events distributed to those clients when appropriate. Duplicate base event requests are blocked locally and thus only the first such one ever reaches the remote server. The trigger engines are capable of combining events in a complex manner, such as to notify a client only when a combination of time events, job events and/or other events have occurred, thus being suitable for use in a batch system.

28 Claims, 17 Drawing Sheets

RELIABLE, SECURE AND SCALABLE INFRASTRUCTURE FOR EVENT REGISTRATION AND PROPAGATION IN A DISTRIBUTED ENTERPRISE

FIELD OF THE INVENTION

The present invention relates generally to computer systems and networks, and more particularly to computer-related events and event handling, especially in a large-scale computer network.

BACKGROUND OF THE INVENTION

Computer programs may be arranged to run or take some particular action when certain conditions are met. For example, a computer system may be configured to run a backup program and/or system maintenance program every weeknight starting at nine o'clock. A payroll application may be run twice a month, and a check-printing program may run when the payroll program completes. A batch system may be employed to launch such jobs when events indicate that conditions for executing each of those jobs are met.

One event system allows subscribers to register with a centralized event service for notification of specified events. As each event is received at the event service, the event service matches the event with one or more subscribers registered for that event, and fires the event to the appropriate subscriber or subscribers.

However, while such an event system is acceptable in some environments, it cannot meet the demands of a large-scale enterprise computing environment, wherein events need to be handled on the order of one-hundred events per second. At present, existing event handling systems are unable to satisfy the amount of event handling needed in a large-scale enterprise computing environment.

Security is another issue of concern to large-scale enterprise computing. For example, with existing systems, it is possible for a malicious user to tap into an event, whereby the event could be used to trigger an undesirable action, such as erasing needed data. Similarly, if an event's information is modified, whether intentionally or inadvertently, the event is likely to cause unpredictable behavior that may be damaging. Another related issue is access-control as to which job (or who) may trigger a particular job, and which jobs may consume a particular event. For instance, the ability to start a job that pays bonuses needs to be secure. Similarly, the fact that a sensitive job has completed, along with its status, should be guarded.

Reliability is also a key requirement that cannot be met by existing event services. For example, payroll needs to be run as scheduled, as the adverse consequences of failing to do so on time can be readily appreciated. However, if the event that triggers the running of the payroll application does not arrive, the payroll application will not be run, at least not without manual intervention following recognition that the program is not executing when it should be. Similarly, payroll should not be run more than once per pay period, e.g., two events that trigger the payroll application should not be received in the pay period. However, existing event services do not guarantee that events will be delivered, and delivered exactly once, i.e., there is a possibility that events may be duplicated or dropped.

In short, existing event services are unable to meet the scalability, security and/or reliability requirements needed by large-scale enterprise computing environments. As a result, batch systems and the like that operate based on conditions being met are run on a per-server basis, not across a network. At the same time, smaller scale computer networks also would benefit from increased reliability, security and scalability that have been heretofore unavailable in event handling systems.

SUMMARY OF THE INVENTION

Briefly, the present invention provides a trigger engine and infrastructure for event registration and handling that is reliable, secure and scalable. To achieve reliability and security, transactional authenticated and/or encrypted messages, such as available via MSMQ (Microsoft Message Queue Server) services, are used to transport events across each server. To extend the reliability from end to end (client to client), a stable recovery mechanism is provided wherein the recovery path is nearly identical to the normal path.

To achieve high performance and scalability, a switchbox component (of which each trigger engine is a proxy) performs the "fan-in" and "fan-out" of the events consumed and generated by the trigger engine. This includes concentrating multiple similar requests for event notification into a single base event. For example, if a first client requests event notification when a remote file exceeds a certain size, and a second client requests event notification when the remote file is deleted, the requests are combined into a single base event request for notification when the file is modified in any manner. The switchbox maintains tables to track which client registered for which type of notification. In this manner, only the base event request is registered remotely, reducing the number of events that need to be communicated to remote servers.

When the base event occurs, the switchbox is notified, and analyzes the information accompanying the base event request to determine which registered clients should get the event notification. For example, if the information indicates that the file changed and the file size specified by the first client was exceeded, the first client is notified of the event, but the second client is not. Identical requests from clients may also be concentrated into a base request, and events distributed to those clients when appropriate. Duplicate base event requests are blocked locally and thus only the first such one ever reaches the remote server.

Moreover, the switchbox is capable of combining events in a complex manner, such as to notify a client only when events A, B and C have occurred. Types of events include time events, job events and other events (such as file system events as described above). The present invention is thus ideal for use in a batch system, where batch jobs are launched when possibly complex combinations of events occur, e.g., launch at the successful end of another job, but only if it is a weekday. To this end, a job card is provided by a client, and a job scheduler causes the job to launch when the proper events occur. The scheduler launches the job by loading a trigger engine to connect the job, via the switchbox, to a job dispatcher. The job dispatcher runs the processes needed by the job on remote agents. A trigger engine may be attached to the dispatcher and the agents to communicate with the switchbox, e.g., to fire an event when a job is either complete or has failed.

Other advantages will become apparent from the following detailed description when taken in conjunction with the drawings, in which:

DETAILED DESCRIPTION OF THE PREFERRED EMBODIMENT

Exemplary Operating Environment

Figure 1:
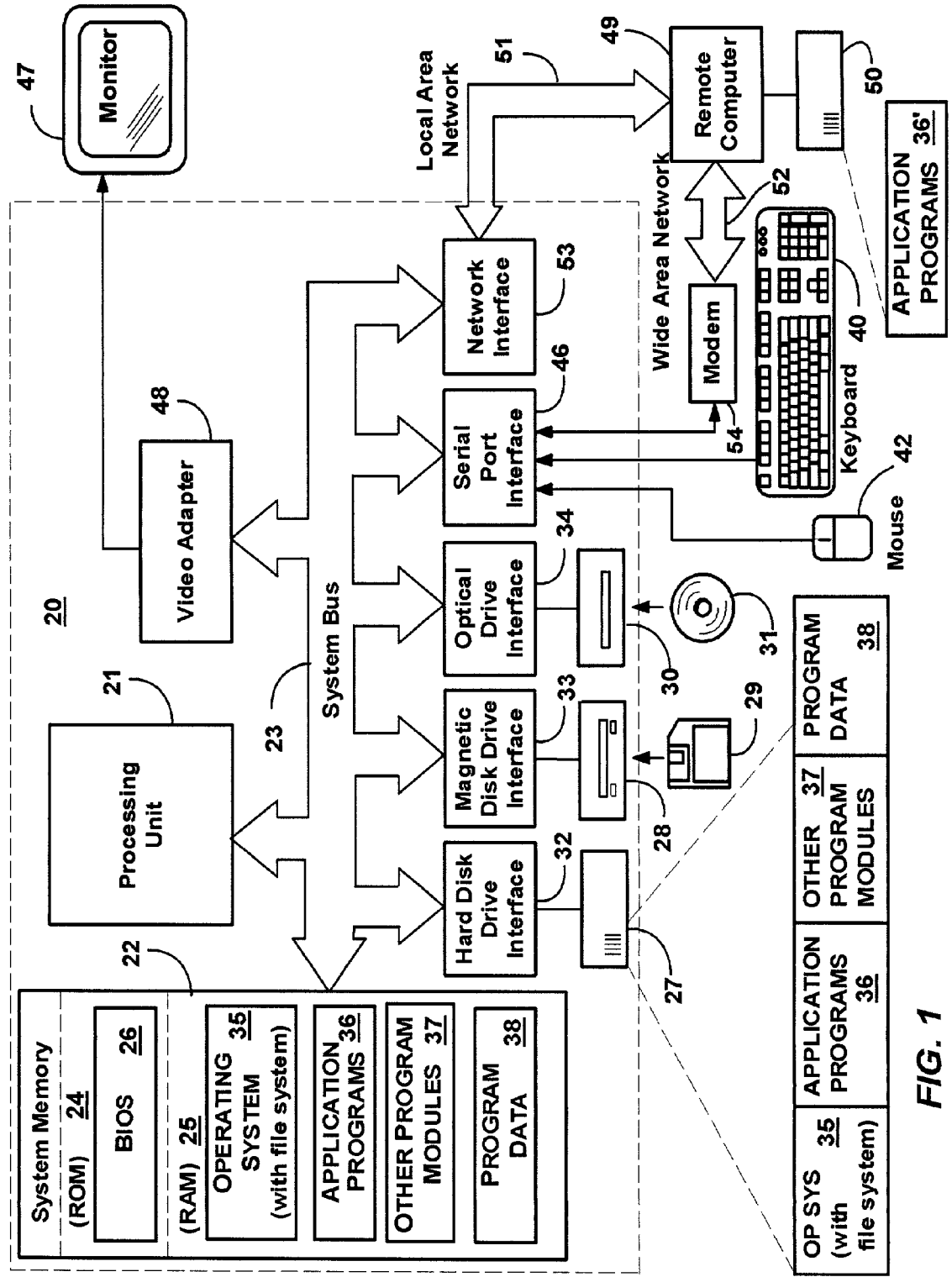
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (such as Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Trigger Engine

The present invention is generally directed to a trigger engine (such as the trigger engine 60 of FIG. 2), which is a component that keeps track of events and alerts a host when the conditions are met. The host is essentially some program/process that takes action when certain runtime conditions are met, that is, upon the occurrence of certain events. A single trigger engine, sometimes referred to as a reliable trigger engine, or RTE, has the ability to receive events and trigger jobs. An RTE can be used in any environment that triggers computer processes, and is thus a primary component for building one exemplary infrastructure described herein, which in general is directed to a batch system. Indeed, the present invention will be primarily described with reference to a batch system environment wherein client jobs (actually job instances) are launched when the conditions for their execution are met. However, it will be understood that the trigger engine component may be attached to other services, such as a dispatcher and agents, to trigger actions in these services that are not necessarily related to batched jobs.

Figure 2:
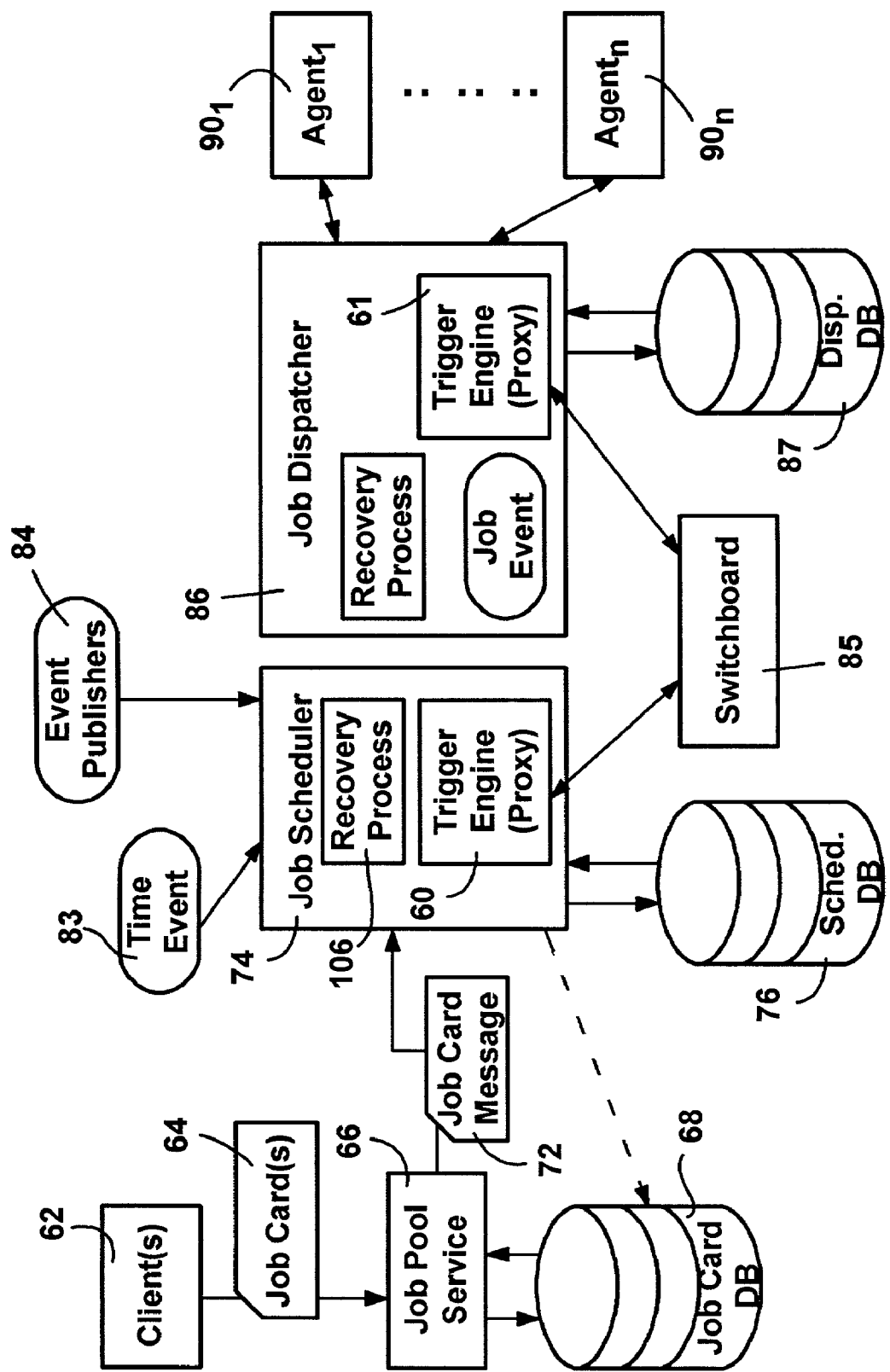
FIG. 2 is a block diagram generally representing components in a system for handling events in accordance with an aspect of the present invention.

Turning to FIG. 2 of the drawings, one or more clients 62 submit a job request (e.g., via a job card 64) to a job pool service 66. The job pool service 66 searches a job database 68 for a corresponding job card (e.g., the information associated with a particular job in virtually any arrangement) that corresponds to the job submitted by a client 62. In one implementation described herein, the job information is keyed in the job database 68 by a job card ID (JCID). Note that the jobs that exist in the database 68 are not the same as job instances, and for example, a single stored job may have multiple job instances executed based on the stored job information. In other words, the database 68 maintains the static information from the job card 64, which is required for scheduling. The database also maintains the event descriptions, where each event impacts a single atom in the job criteria as described below. Note that while the value of an event may change from instance to instance, an event ID is unchanged.

If a job card has changed, (i.e., a job is added, deleted, or modified), the job-pool service 66 sends an appropriate job-card message 72 to a job scheduler 74 to notify the job scheduler 74 to add, delete, or modify the job. The job card message 72 indicates the events and details thereof that will trigger execution of the job, and the job scheduler 74 stores this information locally, such as in its own database 76.

Each job-card message 72 includes a list of one or more events that can trigger job execution (instantiation), and the relationships between these events. By way of example, consider a job that is instantiated when the following expression of events evaluates to True:

((Time>=$T_1$) OR (($Job_{jcid1}$ has ended successfully) AND ($Job_{jcid2}$ has ended with its output parameter P1="abc")))

Note that $Job_{jcid1}$ and/or $Job_{jcid2}$ may in turn have specified numerous conditions specified for their execution, possibly including conditions that also depended on the execution result of other jobs. To avoid undue complexity, one implementation of the present invention restricts the relationships between events to a Disjunctive Normal Form (DNF), or sum of products, which is equivalent to any other Boolean expression. It has been found that the majority of real-world conditions on job execution can be conveniently represented using this form. As can be appreciated, alternative mechanisms (e.g., allowing more-complex Boolean expressions) are feasible, and indeed, essentially any manner of evaluating whether conditions are met will suffice for purposes of the present invention.

In a present implementation, a DNF object comprises up to 255 numbered clauses, and each clause comprises up to 255 numbered atoms. An atom represents a single condition and consists of two classes, namely CAtom, which contains the fields that are assigned values when the job-card is created/modified, and CAtomTE, which contains a pointer to CAtom, and additional fields, which are assigned values when the job is waiting to be instantiated, such as a pointer to a relevant event instance (if any).

The table below sets forth the structure of CAtom:

| | | |
|---|---|---|
| byte | ClauseIndex; | // Atom belongs to this clause within the DNF |
| byte | AtomIndex; | // Index of the Atom within the clause |
| CEventDesc* | Event; | // A pointer to an Event descriptor |
| MsbExtractMethod | EventExtractMethod; | // An enum type |
| WCHAR* | EventExtractKey; | // Identifies (by name) a // specific job output parameter |
| MsbCondAtomOperator | Operator; | // An enum type |
| WCHAR* | OperandString; | // Value, represented as a string |
| bool | AlwaysListening; | // True: accept event instances // outside of batch window. |

The table below sets forth the structure of CAtomTE:

| | | |
|---|---|---|
| const CAtom* | m_pAtom; | |
| CGuid | m_Evid; | // A GUID assigned to the Event Descriptor |
| CEventInstM* | m_pEvInst; | // A pointer to an Event Instance |
| Value_t | m_Value; | // The result of an atom evaluation |

In general, a trigger engine links events to DNFs. Events may be generated in possibly many ways by possibly many event publishers. For example, the job scheduler 74 communicates with (or includes internally) a time event engine 83 or the like that triggers time-based events. Other event publishers 84 such as a driver or other component can trigger an event in response to a hardware condition, e.g., a file system can trigger an event when free disk space falls below some threshold. A job event may be triggered by a job dispatcher 86, which as described below, essentially controls the execution of jobs, and thus knows when a job has completed successfully, unsuccessfully, and/or provided one or more return codes, or when a job exceeded some time limit (e.g. execution duration).

Events are registered with publishers (providers), and sent to registered subscribers. For example, a file system does not inherently know when there is interest in a particular file, but instead is requested to generate an event upon one or more certain conditions, (e.g., if the file is modified in some way, but not just when read). The file system is thus a registered provider of an event, and the entity requesting notification is a registered subscriber.

In accordance with one aspect of the present invention, each event provider such as the job scheduler 74 includes or otherwise connects to a switchbox 85 that handles the events therefrom, such as to send an event to subscribers on the submission for execution of a new job. The job scheduler 74 also receives events such as corresponding to the completion of the job. To this end, a job dispatcher (which controls the execution of jobs) is connected to the switchbox 85 to distribute an event to subscribers including the job scheduler on the completion of a job to indicate the job's completion status. In the implementation represented in FIG. 2, the switchbox 85 has a proxy (e.g., a dll invoked by a host component) comprising a trigger engine component (e.g., 60, 61) in each host (e.g., 74, 86, respectively) for locally handling the events.

The job scheduler 74 and job dispatcher 86 are preferably separate components that each host a respective trigger engine 60 and 61, and may reside on the same machine or on different machines. The job scheduler 74 generally controls when a job will be instantiated in accordance with one or more events, and thus locally maintains details on which events will fire each job, time restrictions, other jobs, files, services and so forth. To this end, the job scheduler 74 maintains (e.g., in the local database 76, keyed by the JCID), the dynamic information related to job scheduling, such as the values of atoms in the job's submission criteria, and also the job instance ID (JIID). The job scheduler 74 also notifies the job dispatcher 86 of which job-related events the job scheduler 74 is interested in. The job dispatcher 86 may connect to a similar database 87 or the like for maintaining its information.

The job dispatcher 86 controls the execution of instantiated jobs on agents $90_1$-$90_n$, which actually execute the jobs (e.g., on remote servers). For example, the job dispatcher 86 allocates appropriate machine resources to each job based on its needs and on data center policies. The job dispatcher 86 thus provides a central point to monitor and control jobs. As described above, the job dispatcher 86 exchanges event-related information with the job scheduler via its locally hosted trigger engine 61 and the switchbox 85. Note that there may be multiple job schedulers and/or job dispatchers in a large-scale enterprise network.

Each trigger engine component (e.g., 60 or 61) provides a number of event-related services, including local event registration, remote event registration, event distribution and local invocation. Local registration instructs the local trigger engine proxy (e.g., 60) to notify its local component (the component that invoked the trigger engine) about events. For example, the job scheduler 74 locally registers with its trigger engine 60 for notification of events, while the job dispatcher 86 locally registers with the its trigger engine 61 for notification of events. Remote registration, which relates to the transfer of events between servers, is performed by the local trigger engine (e.g., 60) communicating with the remote trigger engine (e.g., 61) to specify events of interest. Note that as used herein, the terms "local" and "remote" do not necessarily indicate a different machine.

Once an event occurs, each trigger engine that has registered with the event provider for event notification is also responsible for event distribution to any others registered for notification of that event. Remote events are communicated from the local trigger engine where the event occurred to the remote trigger engine (or engines) that registered for notification. Each local trigger engine also notifies its host when an event has occurred that the host has registered for, including a local (i.e., not remote) event.

The host (e.g., the job scheduler 74 or job dispatcher 86) of FIG. 2) and its respective trigger engine (e.g., 60 or 61) communicate via a defined interface. The services provided by trigger engine (switchbox proxy) to the host include:

| | |
|---|---|
| SetDnf | registration to and un-registration from DNF-related events, when receiving a job-card-msg; |
| RouteEvent | evaluation of dependent Atoms and DNFs, upon Event instance arrival |

The services provided by the host to a trigger engine include:

| | |
|---|---|
| Subscribe | registration to event descriptors; |
| Unsubscribe | unregistration; |
| BackupObject | linking trigger engine to persistent, transactional memory (hard disk); |
| DeleteObject | removal of trigger engine-related objects from persistent memory; |
| Instantiate | perform action (=launch a job) when DNF evaluates to True, i.e., enough conditions are met. |

The switchbox/trigger engine mechanism is reliable in that it operates with supporting mechanisms to guarantee that triggering events are not lost or duplicated, and therefore the actions are taken if and only if they should be taken. To this end, one implementation of the present invention employs the Microsoft® Message Queue Server (MSMQ), which provides loosely-coupled and reliable network (across servers) communications services based on a message-queuing model. The model is sufficiently fast to scale to a large-scale enterprise network, and transactional MSMQ guarantees that queued messages are only sent once and will accurately confirm that a message has been dispatched or received. In MSMQ, requests for work in the form of a message are sent to a queue, where the message will stay until the server becomes available. Further, MSMQ messages can be encrypted and/or authenticated, thereby providing security for events, e.g., it is known whether a received event is intact or modified. MSMQ is well-documented, and is thus not further described herein for purposes of simplicity, except to note that the MSMQ transport satisfies the scalability, reliability and security requirements of large enterprise networks, including enabling batch systems to operate across network servers of large enterprise networks.

Figure 3:
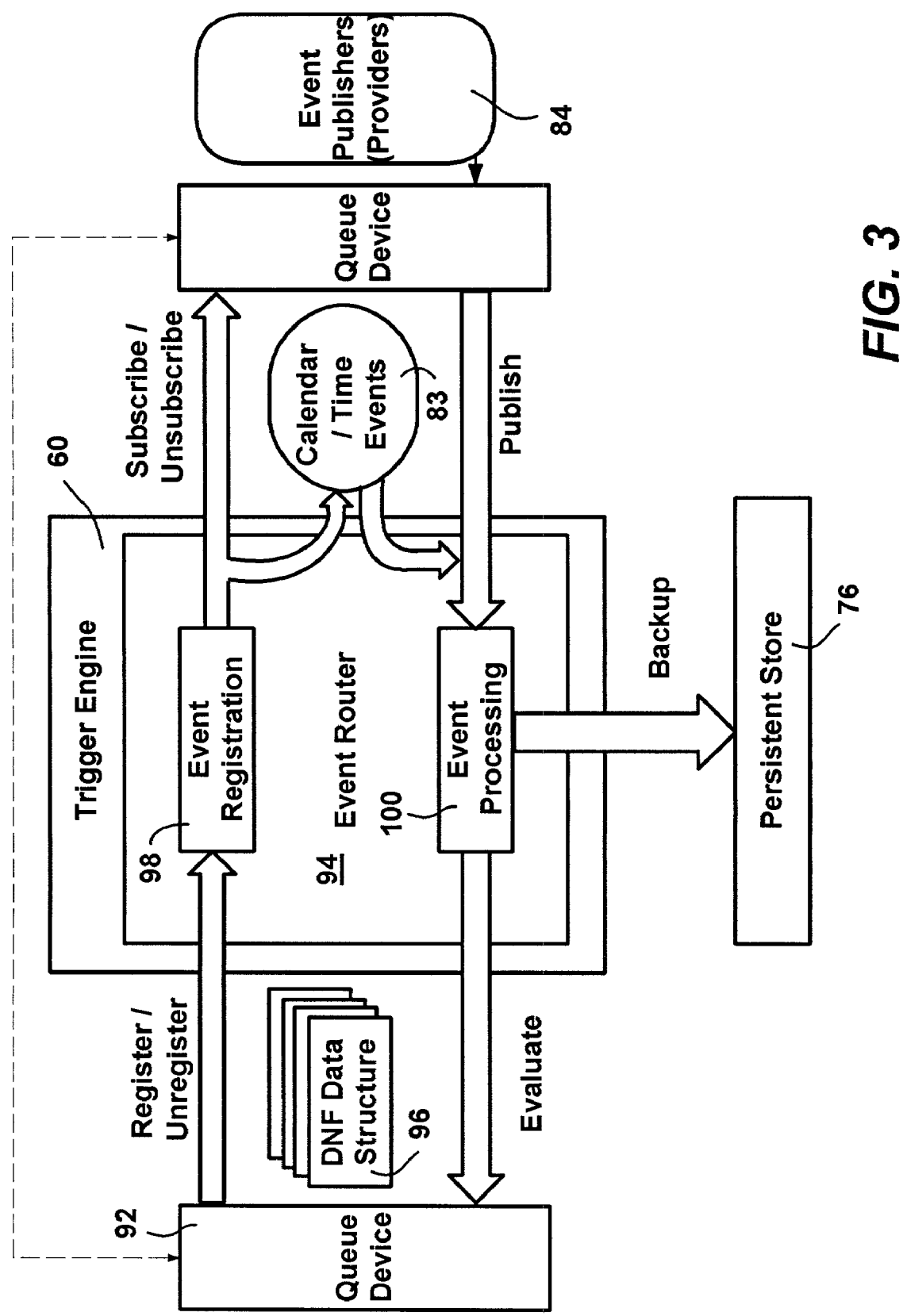
FIG. 3 is a block diagram generally representing a trigger engine for handling events in accordance with an aspect of the present invention.

As generally represented in FIG. 3, to transport event-related information to and from a queue device 92 (or queue devices), the triggering engine (e.g., 60) includes an event router component 94 that receives event registration (including DNFs 96) and unregistration requests at an event registration component 98, and outputs event subscribe (and unsubscribe) requests from the event registration component 98 based on those registration-related requests. The event router 94 also includes an event processing component 100 connected to the queue device 92 that receives published events (e.g., from event publishers 84 and calendar time/events 83). The event processing component 100 contains information linking event IDs to recipients, whereby the event processing component 100 outputs the evaluated events to the appropriate recipients. The event processing component 100 also persists the events in a persistent store (e.g., the database 76 of FIG. 2) for recovery purposes, as described below. As also described below, the event registration component 98 and event processing component 100 include mechanisms to reduce both network traffic and local calls.

In accordance with another aspect of the present invention, scalability is further improved through the use of event concentration, by reducing the amount of event traffic transmitted over the network. To this end, the local trigger engine 101 (of FIG. 4, which may or may not be hosted by a batch system component) concentrates client events related to the same activity into a base event, and registers with a remote trigger engine 102 for notification upon occurrence of the base event. When the base event occurs, the local trigger engine 101 is notified and provided with specific data associated with the event, such as in an event object. The local trigger engine 101 uses an extraction component to determine which client or clients were registered for notification of the actual event that triggered the base event. For example, a set of one or more clients may be interested in notification when a particular job completes with one status code, and another set of clients may be interested in notification when that same job completes with another status code.

Figure 4:
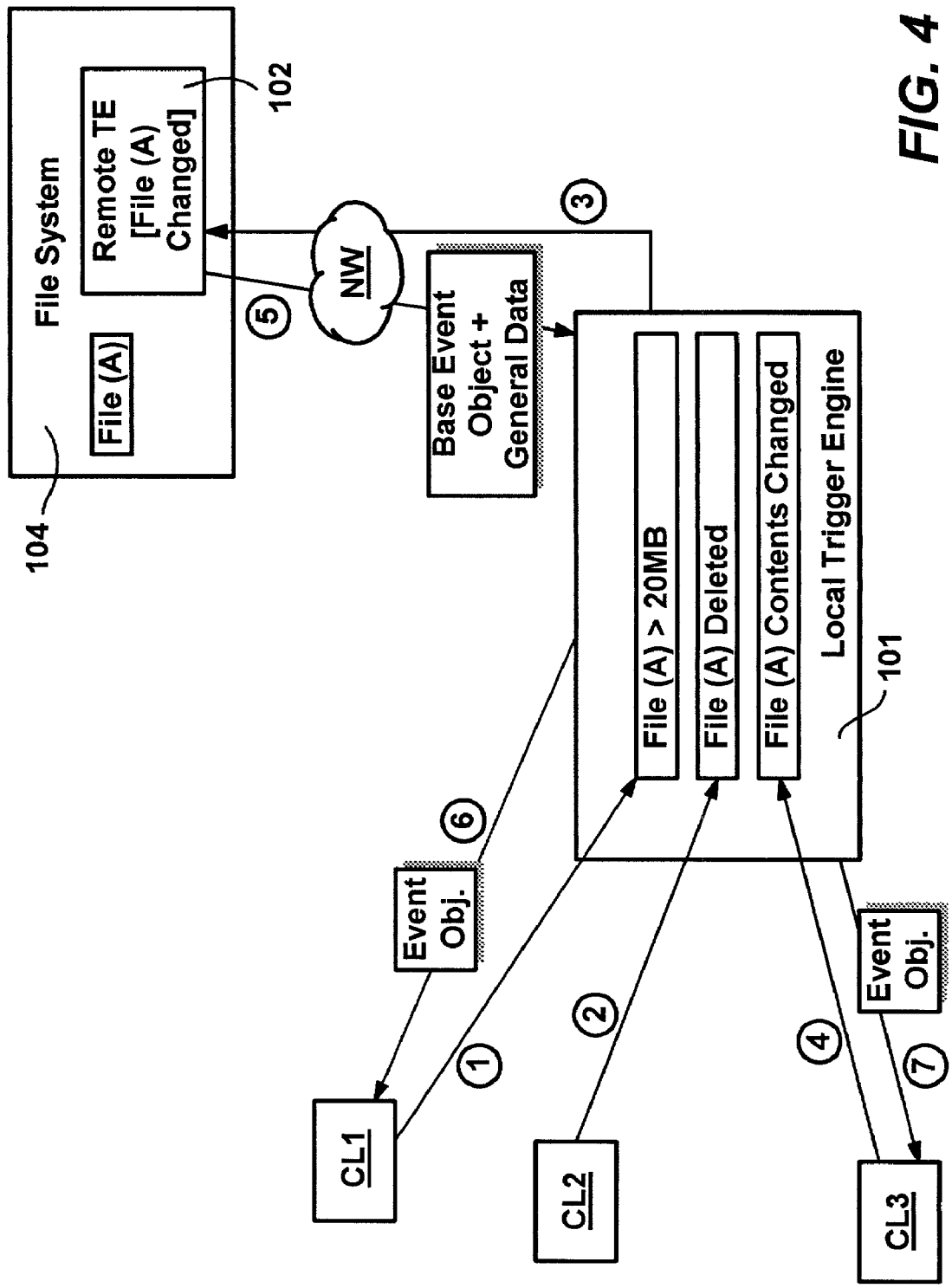
FIG. 4 is a block diagram generally representing the concentration of event requests into base event requests and the distribution following receipt of a base event notification in accordance with an aspect of the present invention.

By way of example, as shown in FIG. 4, consider one client CL1 that has registered with the local trigger engine 101 for notification of a file (A) exceeding a certain size, (e.g., 20 megabytes). In FIG. 4, the circled numerals accompany arrows representing registrations and event notifications, and represent one order in which the registrations and event notifications may take place, although as can be appreciated, much of the order is arbitrary. The registration (circled numeral one) is stored by the local trigger engine 101, e.g., in an internal data structure or a database associated therewith). A second client registration related to file (A) (circled number two) requests event notification if file (A) is deleted.

In keeping with the present invention, rather than register for notification of the specific ">20 MB" and "deleted" events at the remote trigger engine 102 invoked by a remote file system 104, the local trigger engine 101 recognizes the similarity of the events and registers (circled numeral three) for a base event that fires anytime the file (A) is changed in some manner. As also shown in FIG. 4, an additional client CL3 registers for notification (circled numeral four) when the contents of file (A) are changed, e.g., any time the file was written to and is then closed.

Continuing with the example of FIG. 4, some time later the base event registered with the remote trigger engine 102 fires and is transmitted (circled numeral five) along with general data accompanying the base event to the local trigger engine 101. For example, the general data may include the file metadata (datestamp, size, and attributes), and type of operation that occurred, e.g., the file was written to and closed. The local trigger engine 101 receives the base event, and via the Event ID, which is attached to the event instance by the remote trigger engine (the one closest to the event publisher), the local trigger engine 101 determines from its locally stored information the client or clients that have registered for an event that matches the actual event underlying the base event. For example, if the file was written to and closed, and as a result now exceeds twenty megabytes in size, the general data accompanying the base event will include that information. Based on that information, the switchbox determines that both clients CL1 and CL3 (but not CL2) need event notifications, and fires an event (circled numerals six and seven) to each client CL1 and CL3 that includes information indicating which registered event has occurred. As can be appreciated, although the above example did not significantly reduce traffic, (one event was fired across the network instead of two each time the event fired), in a large-scale enterprise computing environment, many events may be concentrated into one base event, whereby the amount of events transmitted across a network may be considerably reduced.

Note that instead of having any change to the file (A) fire the base event, the base event alternatively may be arranged as a compound event, e.g., fire the base event if file (A) is greater than twenty megabytes OR if file (A) is deleted. In this manner, a base event will not be fired even if file (A) changes unless at least one trigger engine has an interest in the particular type of change. Alternatively, the breadth of a base event may be varied as appropriate for a given system. For example, instead of having a base event that corresponds to a single file, the base event may correspond to a certain directory or disk drive such that a change to any file therein will fire a base event. However, the broader the base event, the more likely events may fire for which no subscriber has actually registered. Further, note that the actual event specified can be registered rather than the base event if it is more efficient to do so, e.g., if an event cannot be concentrated with another event into a common base event, then a base event does not provide any benefit, and may fire unnecessarily. To this end, the local trigger engine may employ a threshold test or the like. Using the above example, if only the client that has registered for a delete notification event has an event related to the file (A), then a base event firing every time the file was simply modified may be considered sufficiently inefficient such that the local trigger engine registers for the specific "delete" event instead of the base event.

Turning to an explanation of the operation of the present invention with particular reference to the flow diagrams of FIGS. 6-14, like other messages described herein, a job-card-msg 72 arrives as a transactional MSMQ message. Then, in a single transaction, two or three operations occur, supervised by a local transaction monitor (e.g., a distributed transaction coordinator, or DTC). In one part of the transaction, the job-card message 72 is received and eliminated from the queue, and stored in a local (SQL-Server) database, possibly overwriting a record of an existing DNF having the same job card identifier (JCID). If the job-card-msg represents a new DNF, the current time, called DNF Reset time, is recorded in the local database. Note that because of the transactional semantics, either all of these operations occur, or none occur. Further, note that it is the host's responsibility to persist the list of atoms in a job-card-msg. These atoms remain until replaced by a modified job-card-msg.

Figure 6:
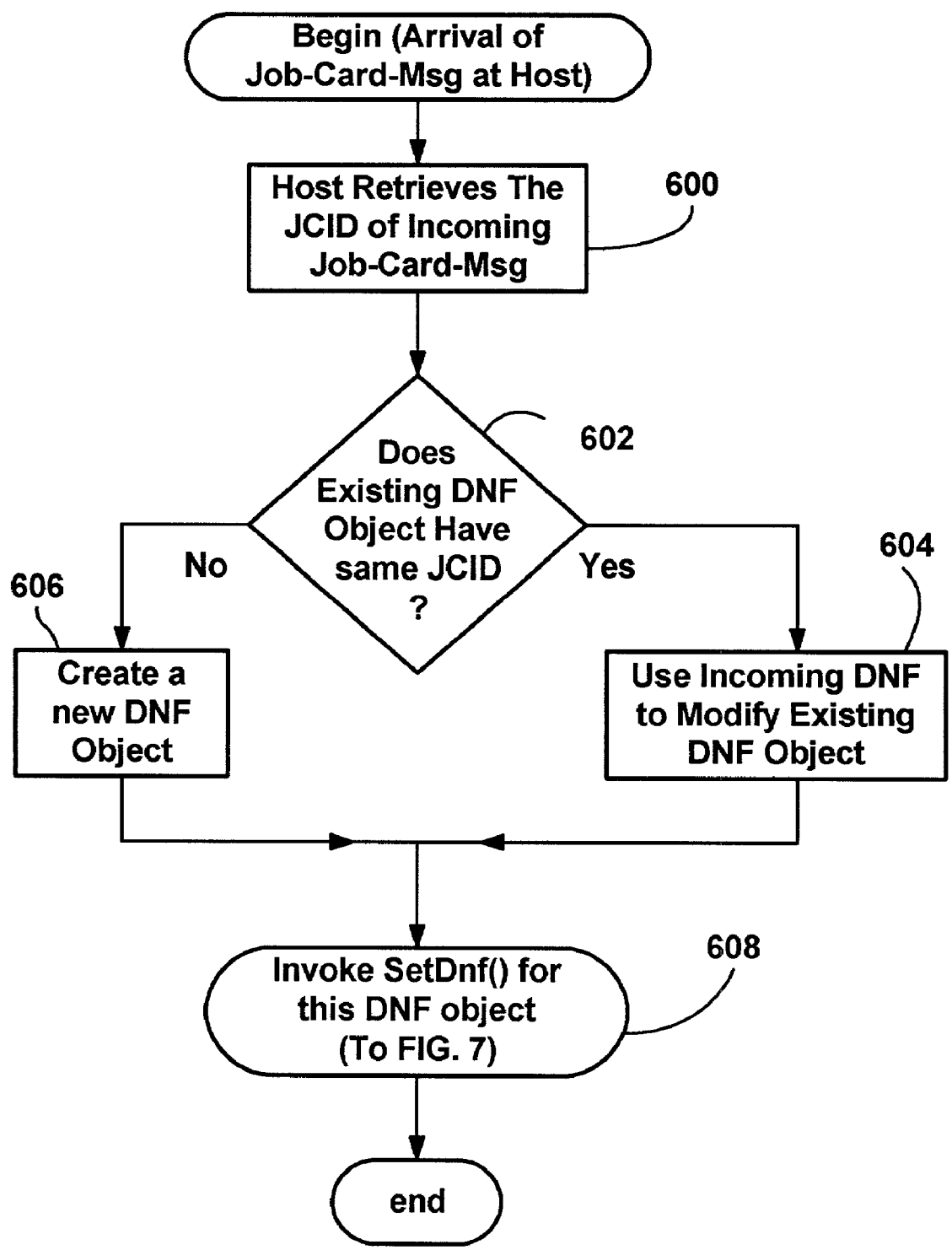
FIGS. 6-10 comprise logical flow diagrams generally representing the flow of operation upon arrival of job-card-message at a host of a trigger engine in accordance with an aspect of the present invention.

As generally represented in FIG. 6, when a host retrieves the Job-card ID (JCID) of an incoming job-card-msg, (step 600), the host tries to retrieve an existing DNF with the same JCID (step 602). If an existing DNF with the same JCID is located, the incoming DNF is used to modify the existing DNF at step 604. Otherwise, a new DNF is created with the JCID at step 606. Whether the DNF object is new or existing, the host invokes the SetDnf( ) function of the trigger engine for registering this DNF object at step 608.

Figure 7:
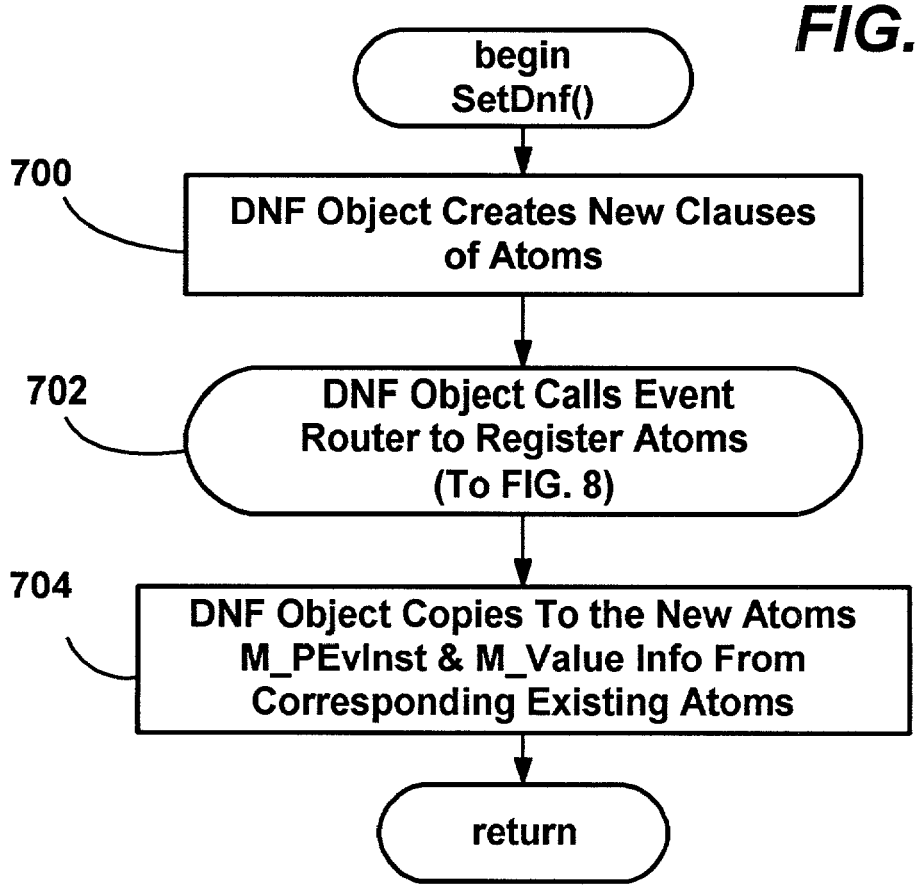

The SetDnf( ) function for registration is described with reference to FIG. 7, beginning at step 700, wherein the DNF object creates new clauses of atoms. At step 702, the process then calls the event router component (e.g., 94 of the trigger engine 60, FIG. 5) to register the atoms in the event router 94.

Figure 5:
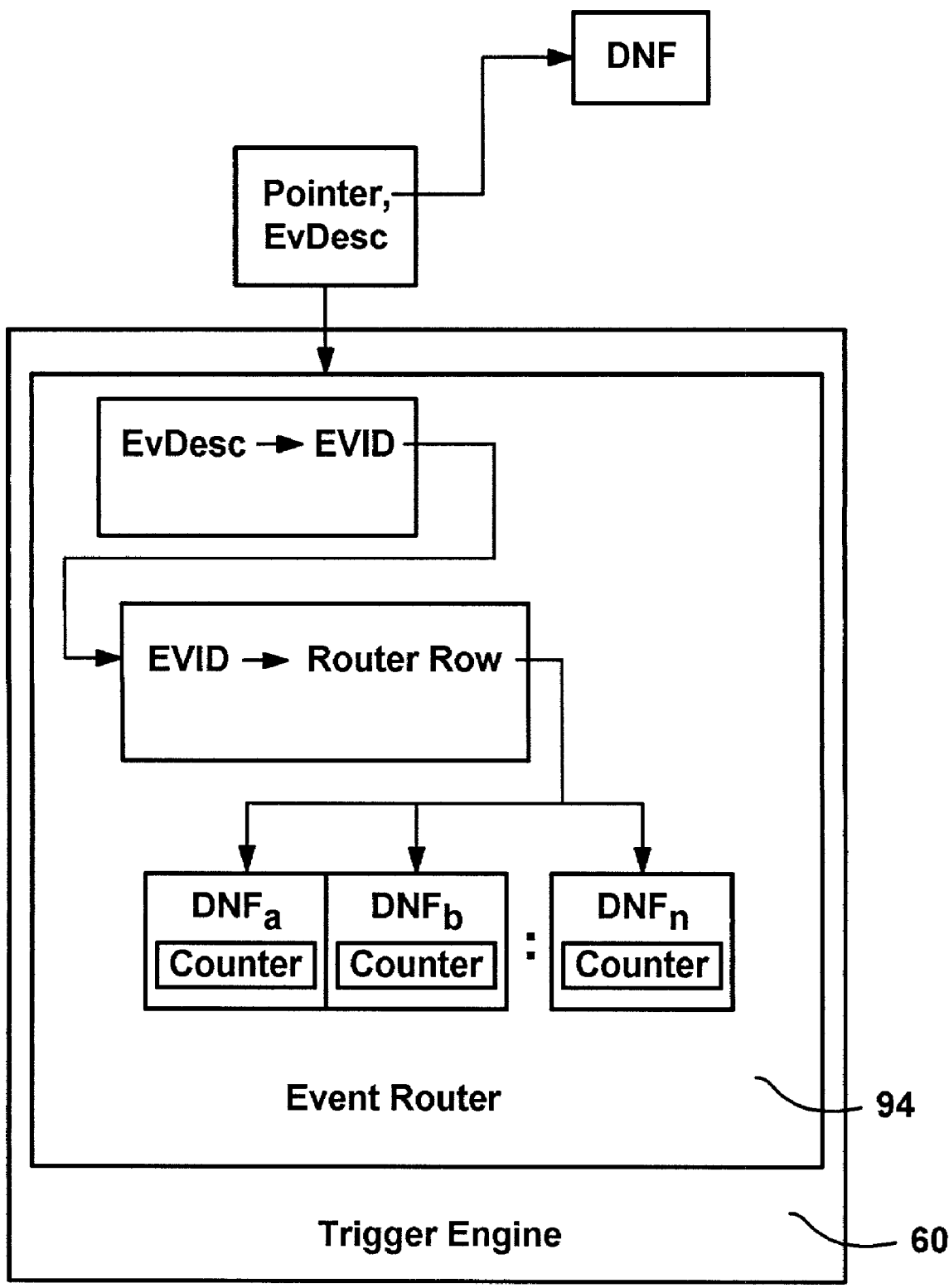
FIG. 5 is a representation of data structures maintained in association with a trigger engine in accordance with an aspect of the present invention.
Figure 8:
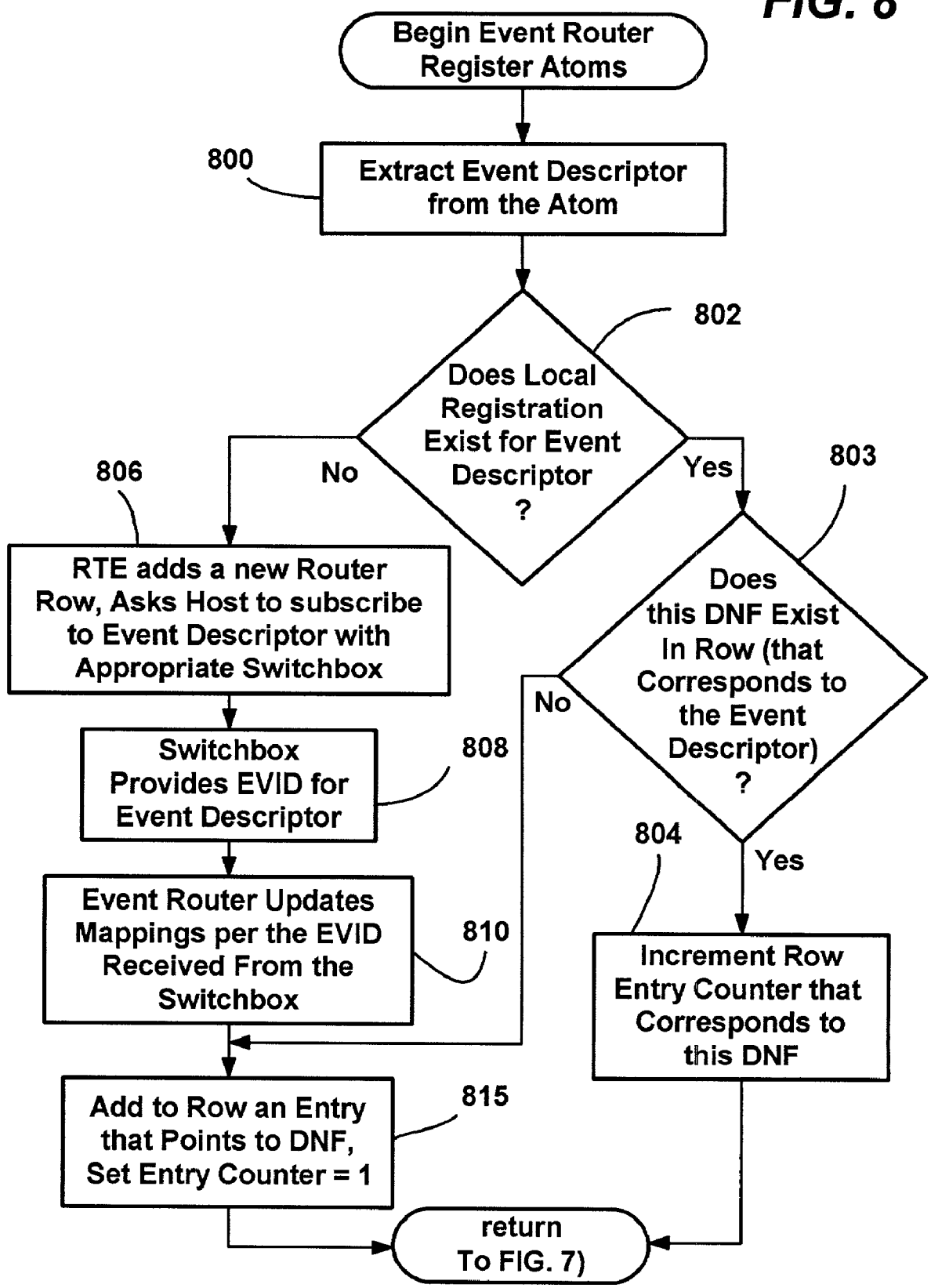

FIG. 8 describes the registering of the atoms in the event router 94, i.e., via the Register( ) function, beginning at step 800. Event registration is distributed in the system, in that the local trigger engine (e.g., 60) notes the registration locally, and passes the request over to the switchbox 85 only when the remote trigger engine (e.g., 61) does not already have the information. To this end, when the event router 94 is invoked with a request to register a new DNF, it is given a pointer to the invoking DNF, and an event descriptor (EvDesc), as generally represented in FIG. 5. As also represented in FIG. 5, information in the event router includes a map from the event descriptor (EvDesc) to an EVID (a GUID assigned to the event descriptor). Note that multiple DNFs can rely on the same EvDesc, and to optimize execution (e.g., CPU and memory utilization), EvDesc is registered only once locally. The event router 94 also includes a mapping from the EVID to a router row (FIG. 5). The router row contains a vector of pointers to DNFs, each DNF with its own counter, wherein the counter holds the number of atoms within a given DNF that rely on the same EvDesc. It should also be noted that the use of consistent naming and identifiers help indicate common events and thus support increased scalability. For example, if multiple job schedulers are connected to a common job dispatcher, the job schedulers can register for the same events. Consistent identifiers and/or naming (e.g., hierarchically-organized) enable the dispatcher to recognize when requests to register common events are being made.

Continuing with the DNF registration process at step 802, the trigger engine tries to find an existing local registration for the given EvDesc. If an existing registration is found and if the DNF pointers match, (the DNF exists in the row that corresponds to the event descriptor at step 803), the counter associated with the registered DNF is incremented at step 804 to reflect the additional registration for an Atom of the same DNF that consumes events of the EvDesc of that row. If EvDesc row is found, but at step 803 the DNF pointer does not match any of those already pointed by the row, (that is, this is the first DNF atom that associates with this EvDesc), a DNF pointer is added to the row and its counter is set to one (step 815). If EvDesc row is not found, step 802 branches instead to step 806 wherein the trigger engine adds a new router row, and calls the host to ask it to subscribe to the EvDesc with the proper switchbox. At step 808, the switchbox provides the EVID for EvDesc. The event router mappings are updated at step 810, and the new row has a pointer to the DNF added thereto (step 815). The counter is set to one for this DNF at step 815. The Registration( ) process then returns to continue at step 704 of the SetDnf( ) process of FIG. 7. At step 704 of FIG. 7, the DNF copies to the new atoms the pointer to an event instance (_pEvInst) and the result of an atom evaluation (m_Value) from corresponding existing atoms. Note that step 704 is directed to handling the situation of a modified DNF. For example, if a previous DNF relied on events E1 and E2, and a new DNF relies on events E1 and E3, and the event E1 has already occurred, but neither E2 nor E3 has yet occurred, then step 704 copies the results of E1 over to the modified DNF.

Note that if the trigger engine cannot link the event descriptor to an existing EVID, it subscribes to the switchbox 85 on this event. The switchbox 85 returns a new EVID, and the trigger engine persists the <EventDescs, Evid> pair. The pair remains until Unregister( ) is invoked, as described below, wherein it is cleaned up. Thus, the remote trigger engine (e.g., 61) is only contacted by the local trigger engine (e.g., 60) when a request is new, i.e., duplicate base event requests are blocked locally and thus only the first such one ever reaches the remote server.

The DNF Reset time is persisted by the trigger engine. DNF Reset occurs when a DNF is new, (e.g., upon creation), and following its evaluation to True and the subsequent instantiation. Upon instantiation, a new DNF Reset time replaces the old one. Cleanup is performed when a job-card-msg deletes a DNF.

Considering next event unregistration, it is noted that unregistration is distributed in the system much like event-registration. The local proxy notes the unregistration locally, and passes the request over to the switchbox only when the last local client has unregistered. Likewise, the switchbox deletes the event-registration altogether when the last client in the system has unregistered. This cleanup operation improves scalability.

Figure 9:
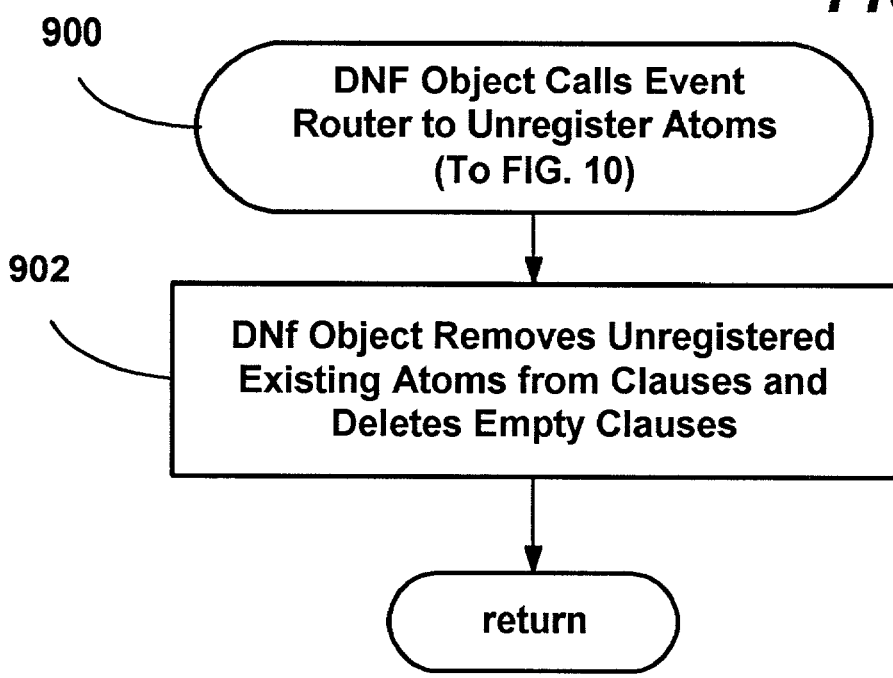
Figure 10:
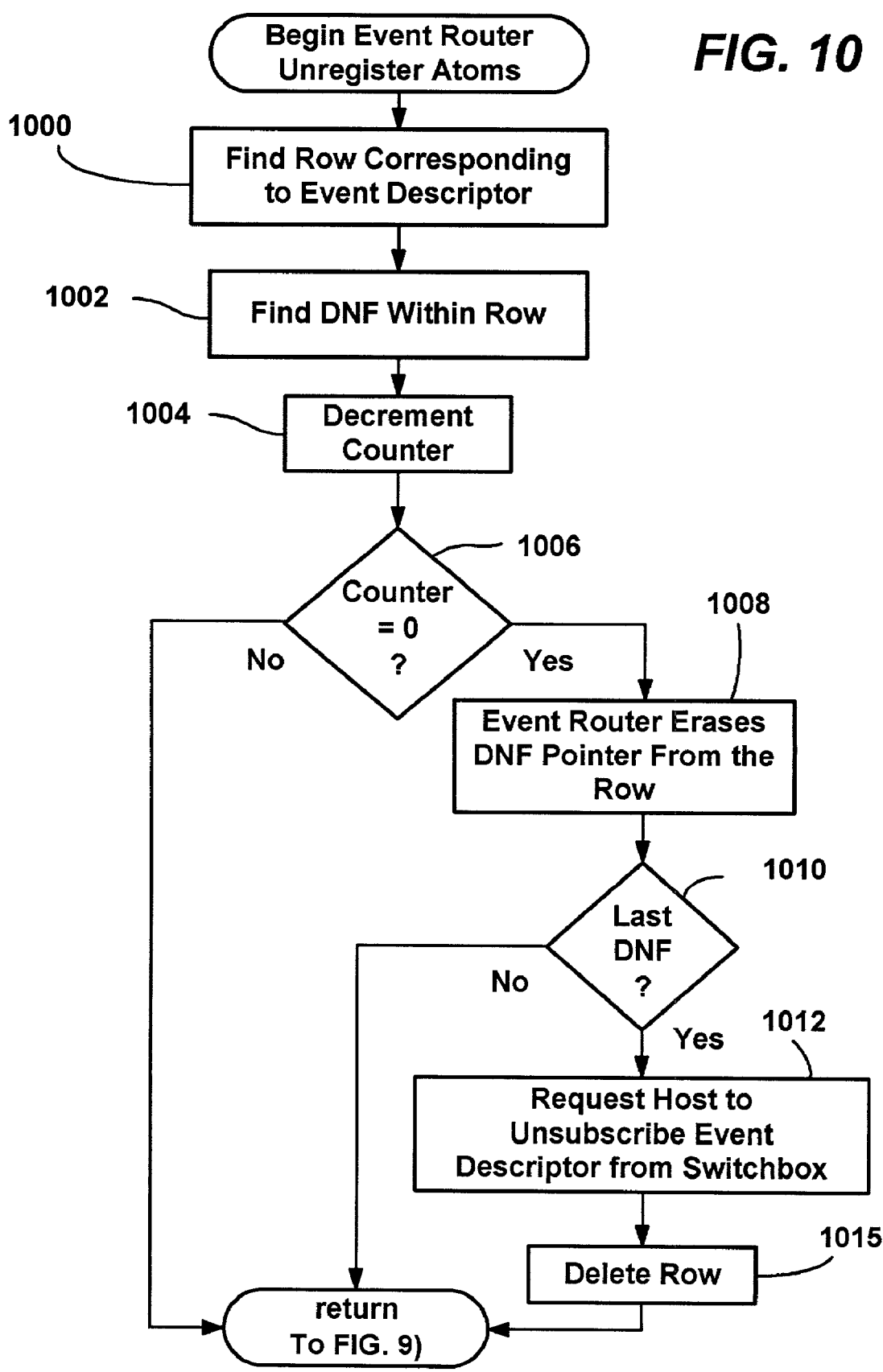

Step 900 of FIG. 9 represents SetDnF( ) unregistering existing atoms by invoking Unregister( ) in the event router 94, as generally represented in FIG. 10. FIG. 10 is generally the opposite of the above-described registration process. At step 1000 of FIG. 10, the Unregister( ) process of the event router finds the row that corresponds to the EvDesc, and finds the DNF within this row (step 1002).

At step 1004, the counter for the DNF is decremented. If the counter does not equal zero, then the DNF is still in use by the job (that is, the DNF has multiple atoms referring to the same EvDesc row), and the process returns to step 902 of the SetDnf( ) process of FIG. 9. If the counter equals zero, then the DNF is no longer needed, and step 1006 branches to step 1008 where the event router removes the DNF pointer from the row. If this was the last DNF, (step 1010), the host is requested to unsubscribe the EvDesc from the switchbox 85 (step 1012), the row is deleted from the event router (step 1015), and the Unregister( ) process returns to step 902 of the SetDnf( )/Unregister( ) process of FIG. 9.

At step 902 of FIG. 9, the DNF removes unregistered existing atoms from the clauses, and deletes empty clauses before the SetDnf( )/Unregister( ) process returns. Note that step 902 is directed to handling situations wherein a DNF is modified. For example, if an atom that relies on event E2 is being replaced by an atom that relies on event E3, the event E2 is unregistered.

Turning to the arrival of an event instance, when Event Instance message (ev-inst-msg) arrives, the host calls RouteEvent( ) process of the trigger engine. Ev-inst-msg arrives as a transactional MSMQ message. Then, in a single transaction, as supervised by the local DTC, the message is received and eliminated from the queue, and the message is stored in a local (SQL-Server) database. Also, for every dependent job which is evaluated to True, a job-inst-msg is sent to the job dispatcher 86, the DNF Reset time is recorded locally, and a reference counter for the event is decremented. When the reference counter hits zero, a destructor for the event adds its identifier to the list of redundant event instances (REIs). Note that because of the transactional semantics, either all these operations occur, or none. REIs are cleaned-up by a separate thread, which occasionally wakes up and deletes them as necessary. The cleanup operation supports scalability.

Figure 11:
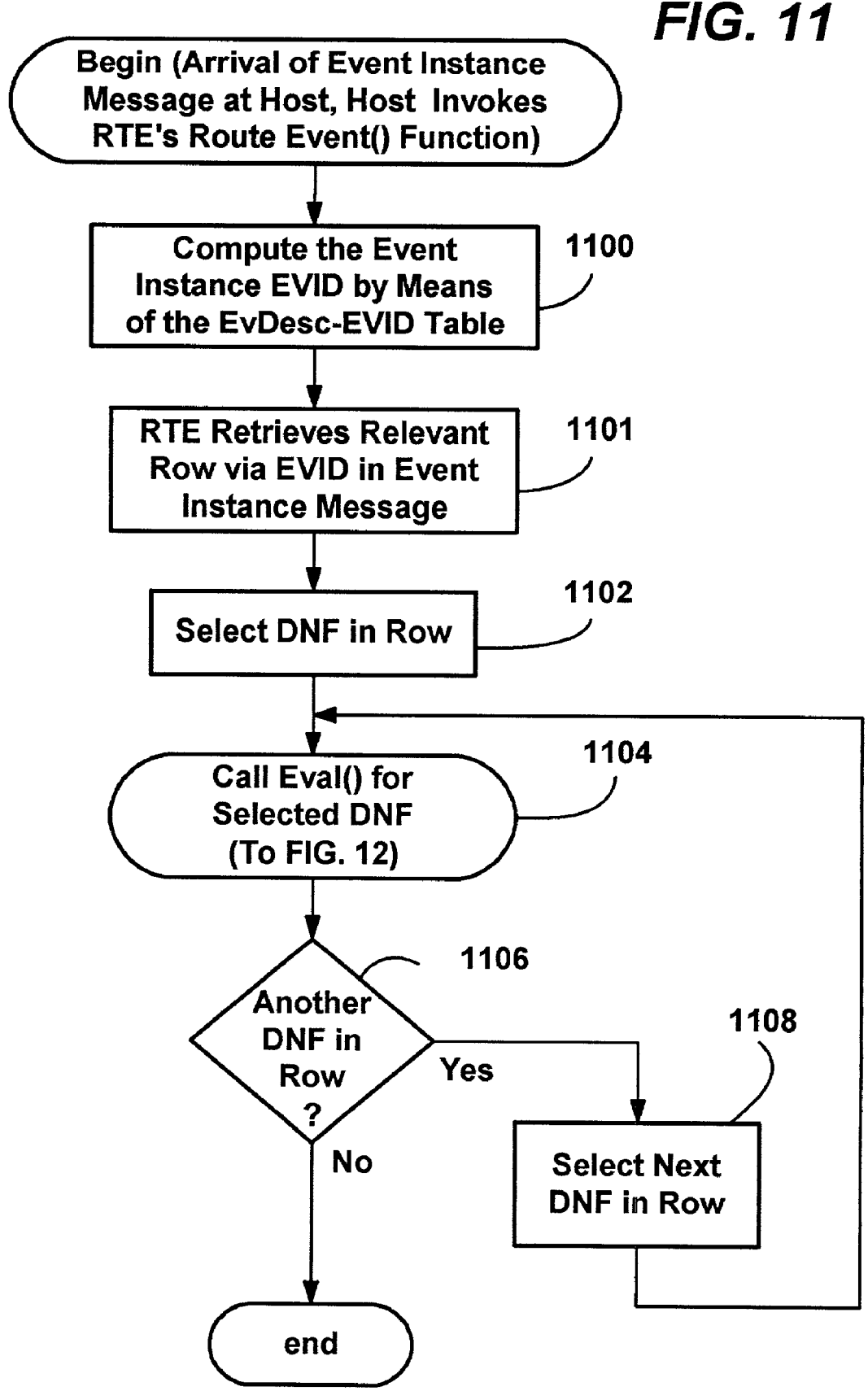
FIGS. 11-14 comprise logical flow diagrams generally representing the flow of operation upon arrival of an event instance at a host of a trigger engine in accordance with an aspect of the present invention.

The RouteEvent( ) process of the trigger engine is generally represented beginning at step 1100 of FIG. 11, wherein the event instance EVID is computed using the Event Router EvDesc-EVID table. At step 1101, by using the EVID of the event, which is embedded in the ev-inst-msg, the trigger engine fetches the relevant row of the event router. Beginning at step 1102 wherein a first DNF in the row is selected, the trigger engine then traverses each of the DNFs in the row. To this end, via steps 1104-1108, the RouteEvent( ) process invokes the (internal) function Eval( ) for each DNF in the row, as generally represented in FIGS. 12A and 12B.

Figure 12A:
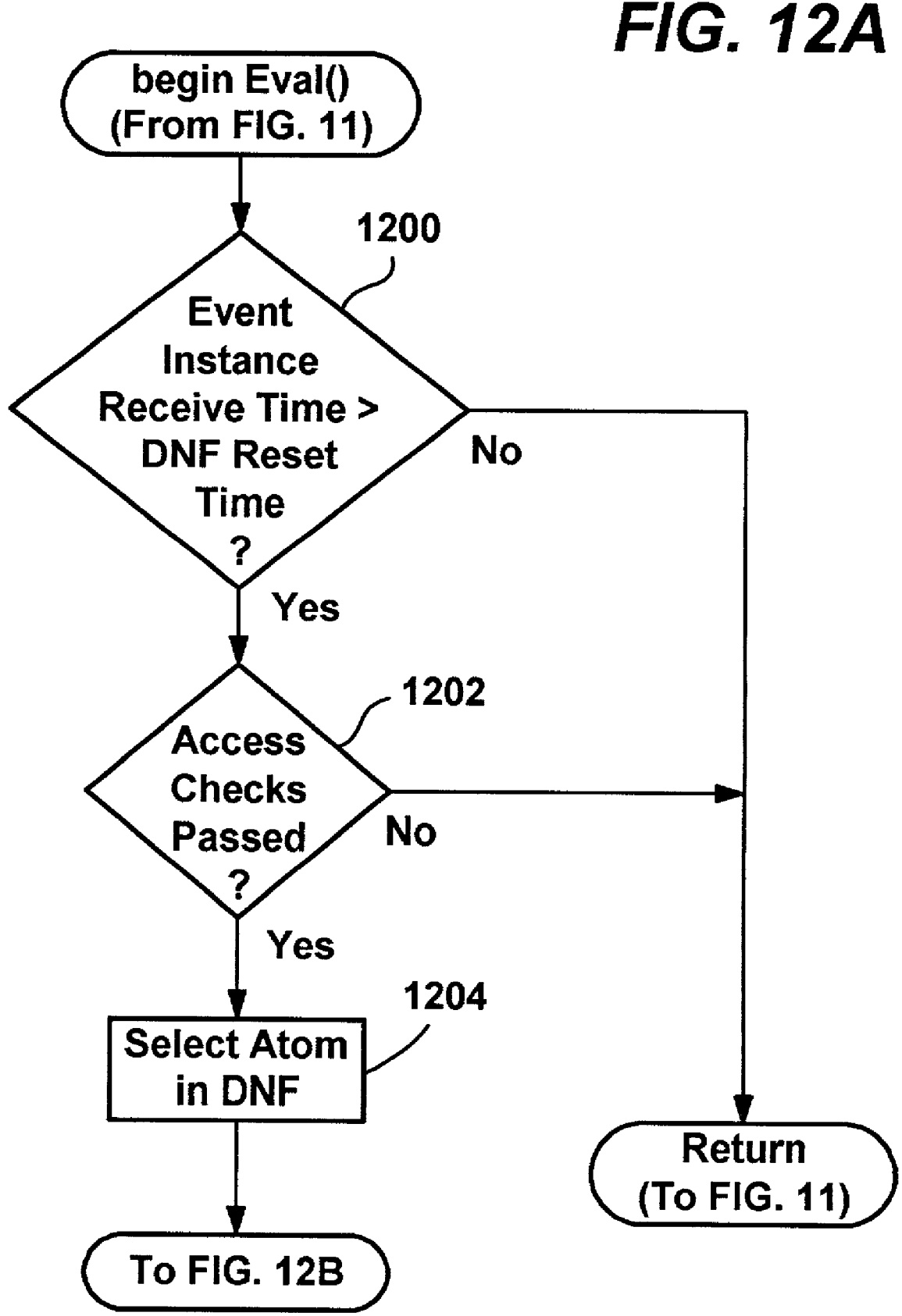
Figure 12B:
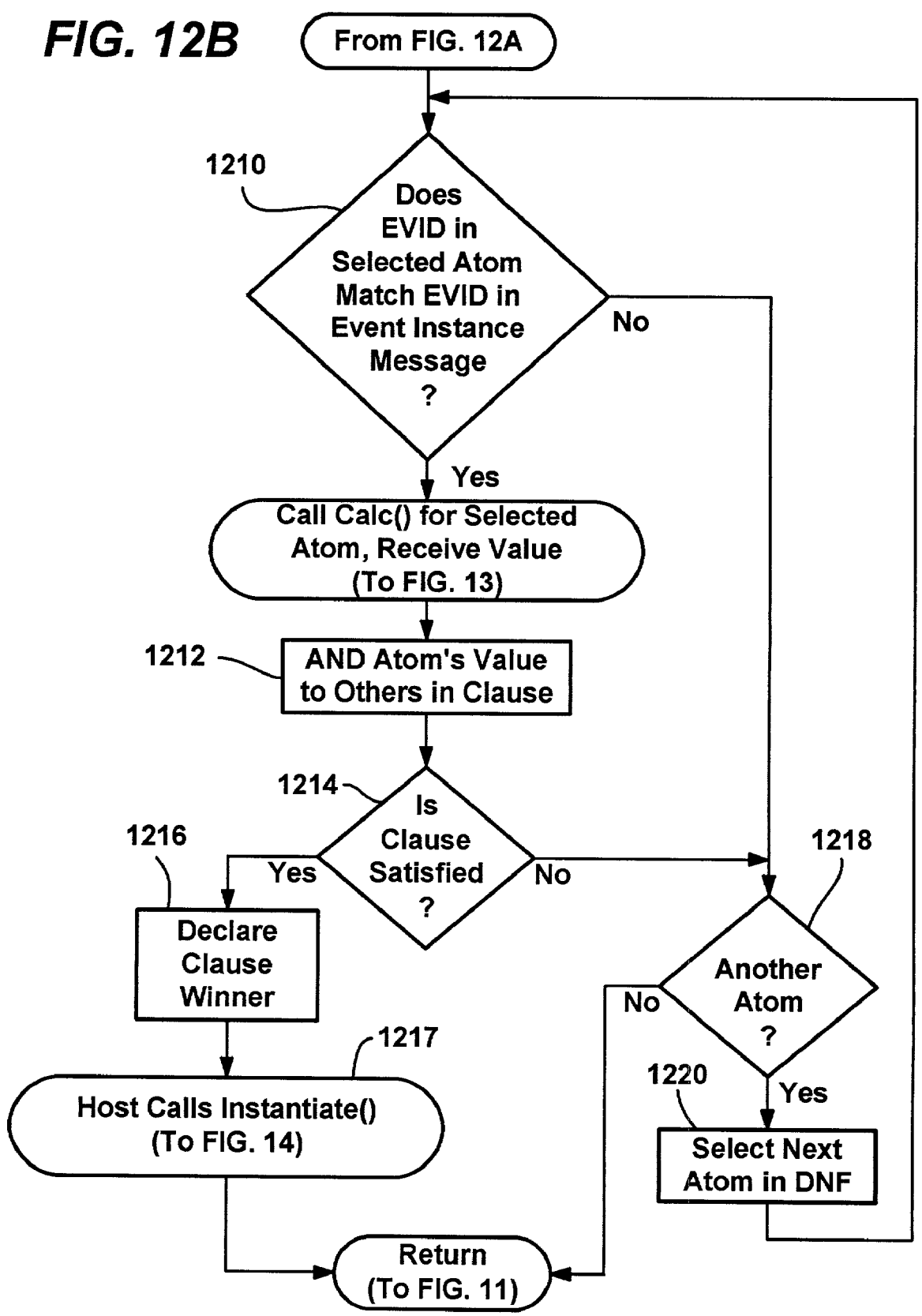

In the Eval( ) process generally represented in FIGS. 12A and 12B, the DNF traverses each of its atoms. The atom invokes the event instance object to extract its relevant data for the atom, passing to it the extraction method and possibly a key. For example, for a job event instance, the event might be of type "JobParam," in which case the extract mechanism will return the value of the job's output parameter identified by the key (e.g., P1).

At step 1200, the Eval( ) function checks that the Event Instance Receive time is greater than the DNF Reset time. If so, the Eval function continues to step 1202 with the current DNF, and the current event instance. If not, Eval returns via the no branch of step 1200.

At step 1202, access checks may be optionally performed. In general, a first access check determines whether the Event-Instance User ID is allowed to trigger the Job of this DNF (as per this job's access control list). A second access check determines whether the User ID of the Job of this DNF is allowed to receive the Event-Instance (as per the Event-Instance access control list). If both access checks are successful, step 1202 branches to step 1204, otherwise the Eval( ) process returns. Access checks are further described below.

If the event instance receive time was greater than the DNF Reset time (step 1200), and the access checks were passed (step 1202), at step 1204 an atom in the DNF is selected, and the process continues to step 1210 of FIG. 12B. If at step 1210 the EVID of the selected atom matches the EVID of the event instance, then the Calc( ) method of the selected atom is invoked as shown in steps 1300-1302 of FIG. 13. If it does not match, step 1210 branches to step 1218 to select the next atom, if any.

Figure 13:
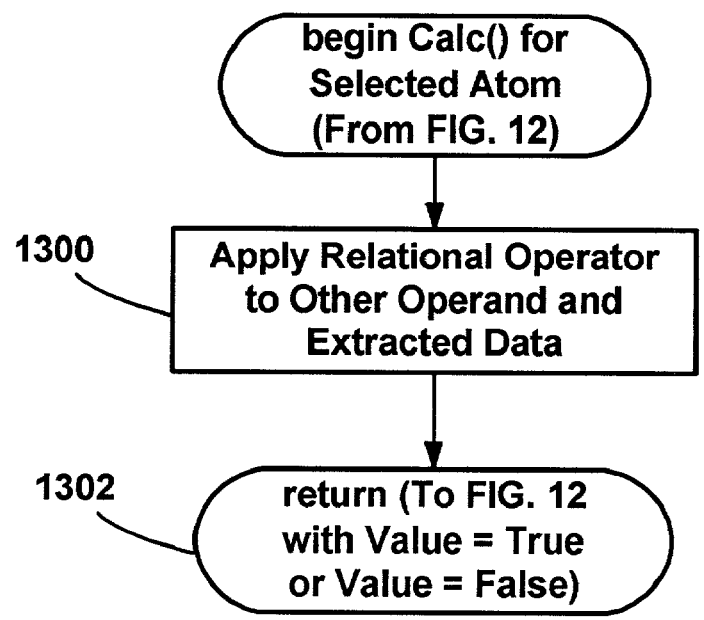

As shown in FIG. 13, the atom applies its relational operator to its other operand and to the extracted data. In the above example, (wherein a job was instantiated if ((Time>=$T_1$) OR (($Job_{jcid1}$ has ended successfully) AND ($Job_{jcid2}$ has ended with its output parameter P1="abc" ))), one atom will test whether the value of the out parameter P1=="abc". A True/False value for the selected atom is returned in step 1302 with the result. If True, the Event-Instance ref-count is incremented at step 1301.

At step 1212 of FIG. 12B, the DNF ANDs the atom's return value with values of other atoms in the clause. If the clause is not satisfied at step 1214, steps 1218 and 1220 repeat the process on the next atom of the selected DNF, unless none remain, at which event the Eval( ) process returns to step 1106 of FIG. 11 to evaluate the atoms in the next DNF, if any. If satisfied at step 1214, the first satisfied clause is declared the winner at step 1216 (and the computation will continue by returning to step 1106 of FIG. 11 to evaluate the atoms in the next DNF, if any).

Figure 14:
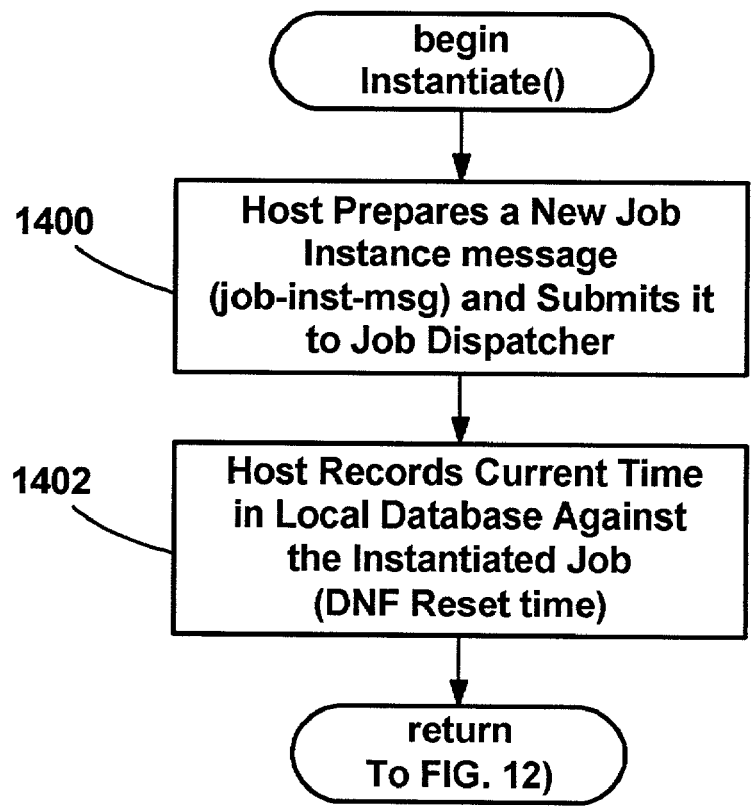

If there is a winning clause, the DNF declares the clause the winner and calls the host to instantiate (step 1217), shown in FIG. 14. In Instantiate( ), the host prepares a new job instance message (job-inst-msg) and submits it to the job dispatcher at step 1400. The host then records the current time in the local database, against the instantiated job (DNF Reset time) at step 1402. As can be appreciated, the trigger engine thus evaluates the atoms in each DNF to instantiate the jobs having conditions that are satisfied by events.

To summarize in the context of a batch job, when a local trigger engine of a job scheduler (e.g., 60 of the job scheduler 74) gets a DNF of a new job, it saves the information and determines whether the job event or events are already registered (e.g., via another job) at the appropriate remote trigger engine (e.g., 61 of the job dispatcher 86). If not already registered remotely, the local trigger engine 60 concentrates the event request into base event request, and sends out the base event request to the remote trigger engine. As a result, duplicate base event requests are blocked locally and thus only the first such one ever reaches the remote server.

When an event occurs, such as when a job completes, it is distributed (e.g., by the trigger engine 61 of the job dispatcher 86) as an event object. For example, if an agent 90$_1$ has completed a Job A, the agent informs the job dispatcher 86 that is controlling the Job A that job A is finished, and in turn, the dispatcher 86 provides the information about Job A (e.g., successful or unsuccessful, completion code and other output parameters/arguments) to its local trigger engine. The dispatcher trigger engine sends the event object including the information to the remote trigger engine, i.e., to the trigger engine 60 of the job scheduler 74 in the present example. The trigger engine 74 then analyzes the information in the base event object against its local data store (e.g., database tables) to extract the relevant job or jobs that are interested in the completion of Job A, and informs the job scheduler 74 that the event has occurred and may be possibly fired.

The job scheduler 74 will then determine what action needs to be taken based on the information. For example, if job B runs after Job A whenever Job A completes successfully, while Job C (a recovery job) runs after Job A whenever Job A completes unsuccessfully, then only one of the two jobs B or C will be launched after job A completes. The job scheduler 74 causes the appropriate job to be run based on the completion code in the base event. If the criteria for launching another job are not yet satisfied, (e.g., Job D, which requires both that Job A has completed successfully and that it is a Saturday), the job scheduler holds the event information (e.g., indicating Job Instance A completed successfully) to give the criteria time to be met. As described above, the job scheduler maintains a local database for such information.

It should be noted that the reliability of the whole system is essentially governed by the weakest component. Therefore, the switchbox implementation, as other components, should guarantee the "exactly-once-semantics." One possible way to achieve this is to utilize MSMQ, DTC and MS-SQL, and manage the event "fan-in/out" utilizing coordinated transaction. When the switchbox and the trigger engine run in the same address space, it is also possible to converge the transactions of both components to optimize performance.

Recovery

Whenever a host (i.e., the job scheduler 74 in the following example) of a trigger engine starts, it invokes its PerformRecovery( ) routine (shown as the scheduler's recovery process 106 of FIG. 2). This routine builds the trigger engine's memory objects from its persisted tables, and when it returns, the trigger engine is ready to resume its normal operation.

Figure 15:
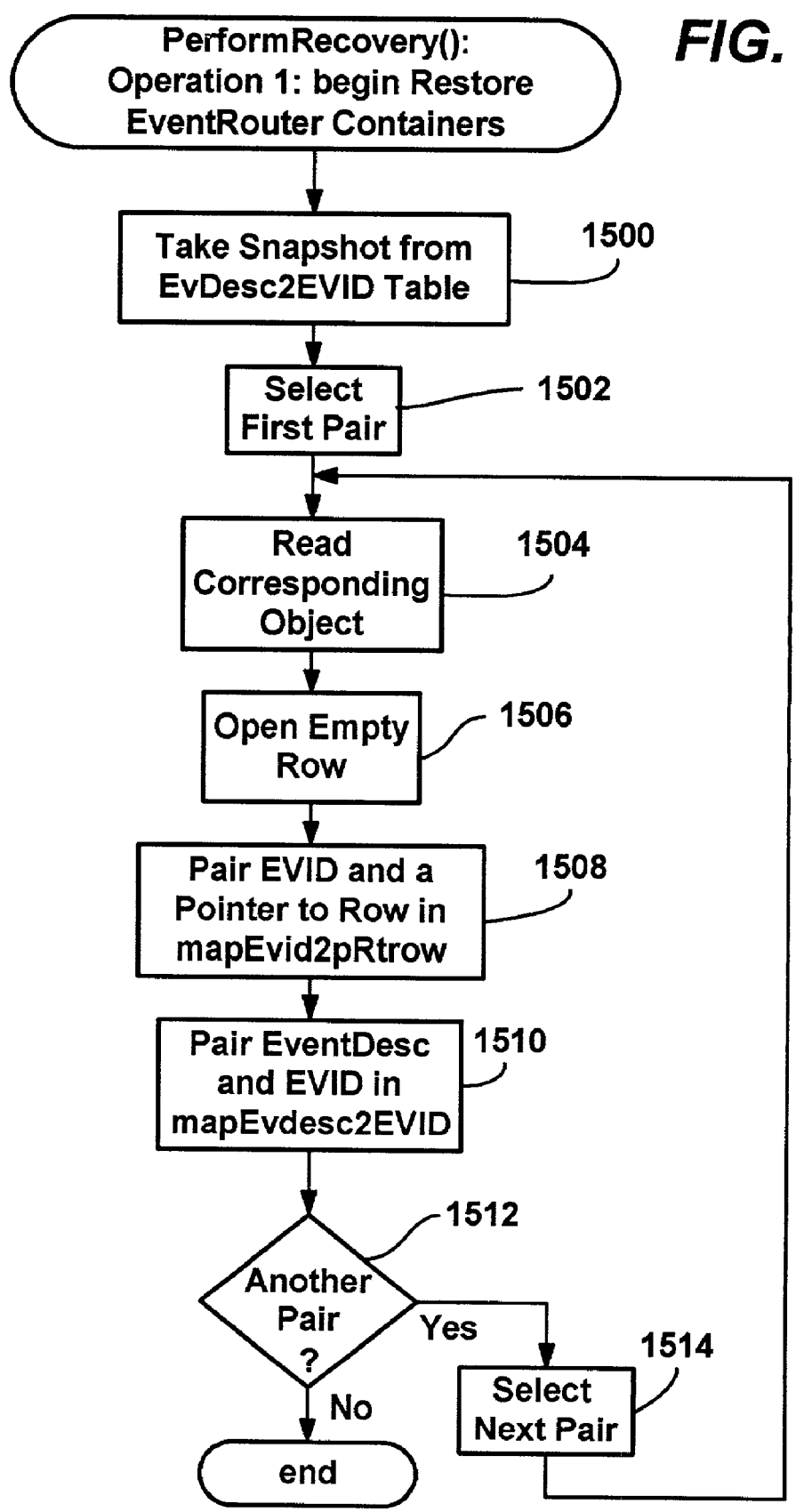
FIGS. 15-18 comprise logical flow diagrams generally representing a recovery operation at startup of a host of a trigger engine in accordance with an aspect of the present invention.

In PerformRecovery( ), a first operation, Operation 1 restores EventRouter containers, as generally represented in FIG. 15 beginning at step 1500. At step 1500, a snapshot is taken from EvDesc2Evid table (the pair <EventDescs, Evid>). For each pair, (repeated via steps 1502, 1512 and 1514), the corresponding object is read (step 1504) and an empty row is opened (step 1506). At step 1508, the EVID and a pointer to this row are paired in mapEvid2pRtrow, one of the Event Router memory objects. At step 1510, the EventDesc and EVID are paired in mapEvdesc2Evid, another Event Router memory object.

Figure 16:
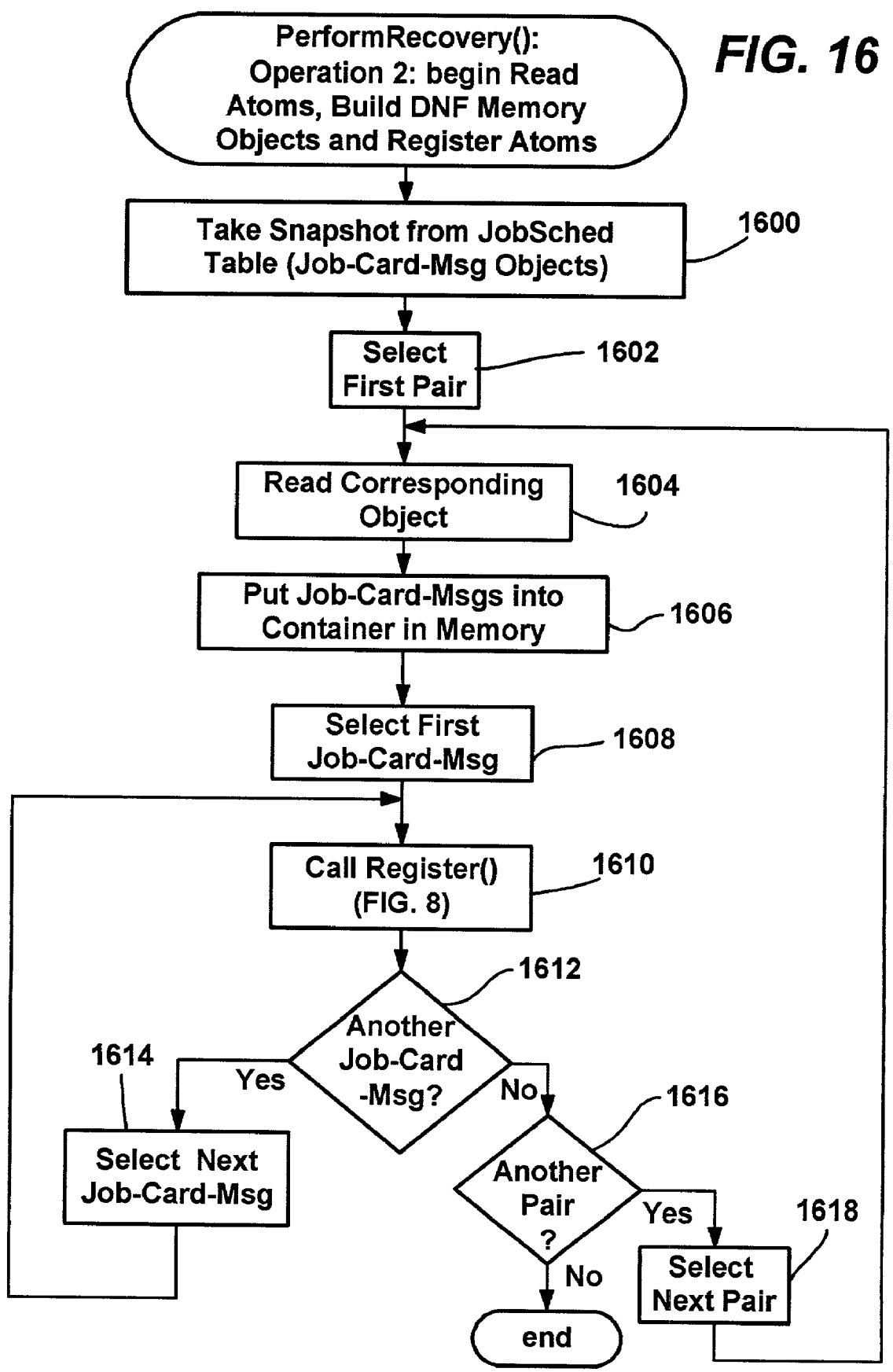

A second operation of PerformRecovery( ), Operation 2, reads Atoms, builds DNF memory objects, and registers the Atoms as generally represented in FIG. 16 beginning at step 1600. To accomplish this, at step 1600 a snapshot is taken from JobSched table (job-card-msg objects). Then, for every pair (the process is repeated via steps 1602, 1616 and 1618), the corresponding object is read (step 1604), and the job-card-msgs are put in a container in memory. For every job-card-msg, (this sub-process is repeated via steps 1608, 1612 and 1614), the Register( ) function (FIG. 8) is called. Note that the registration in Recovery mode is nearly identical to the standard registration, except for persisting of information, which is skipped.

Figure 17:
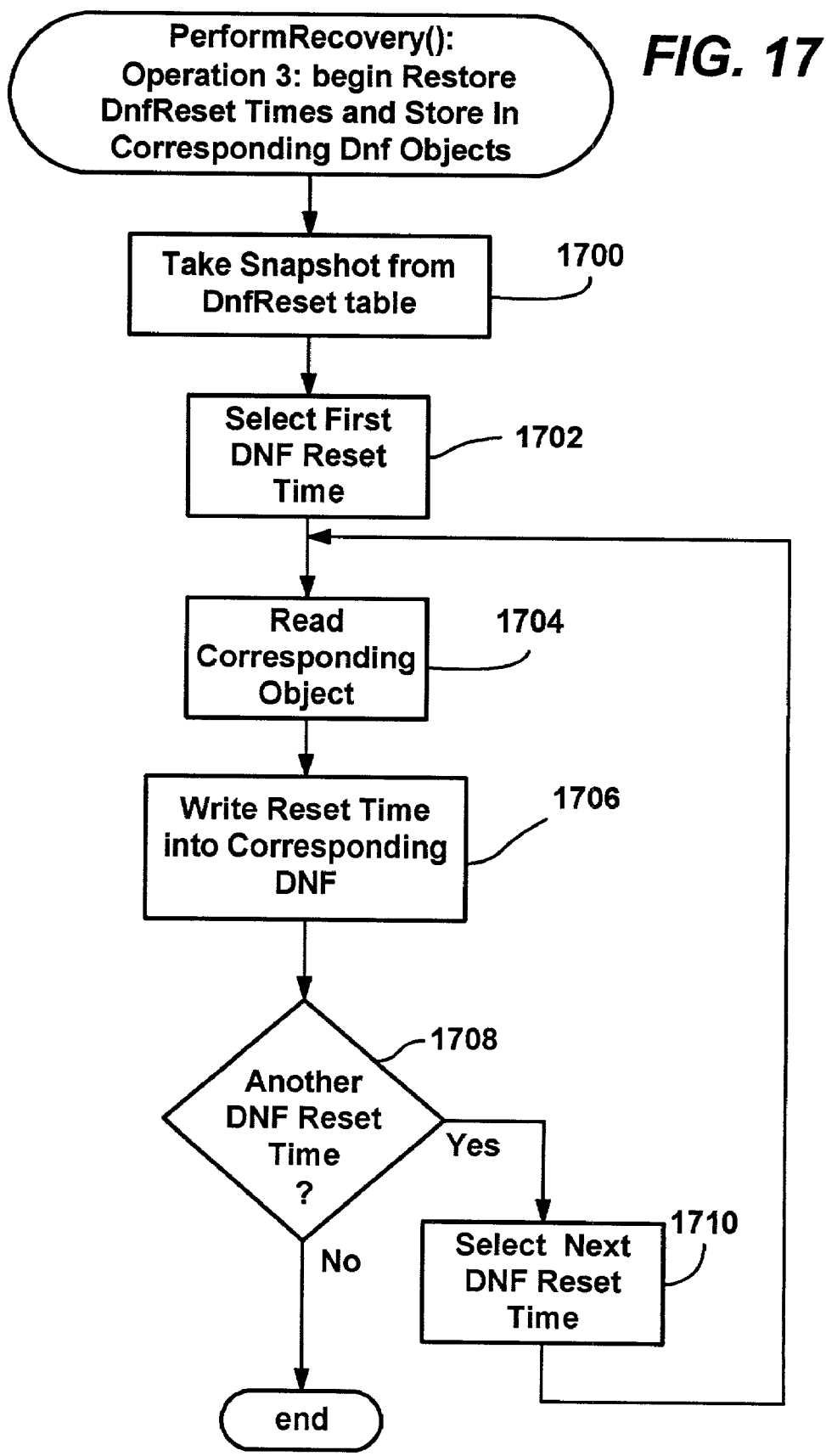

A third operation of PerformRecovery( ), Operation 3, restores DNF Reset times and stores them in the corresponding DNF objects, as generally represented in FIG. 17 beginning at step 1700. To accomplish this, at step 1700 a snapshot is taken from the DnfReset table. For each DNF Reset time, (repeated via steps 1702, 1708 and 1710), the corresponding object is read (step 1704) and the Reset time is written into the corresponding DNF (step 1706). This blocks the DNF from accepting event instances that may have arrived before the DNF was reset.

Figure 18:
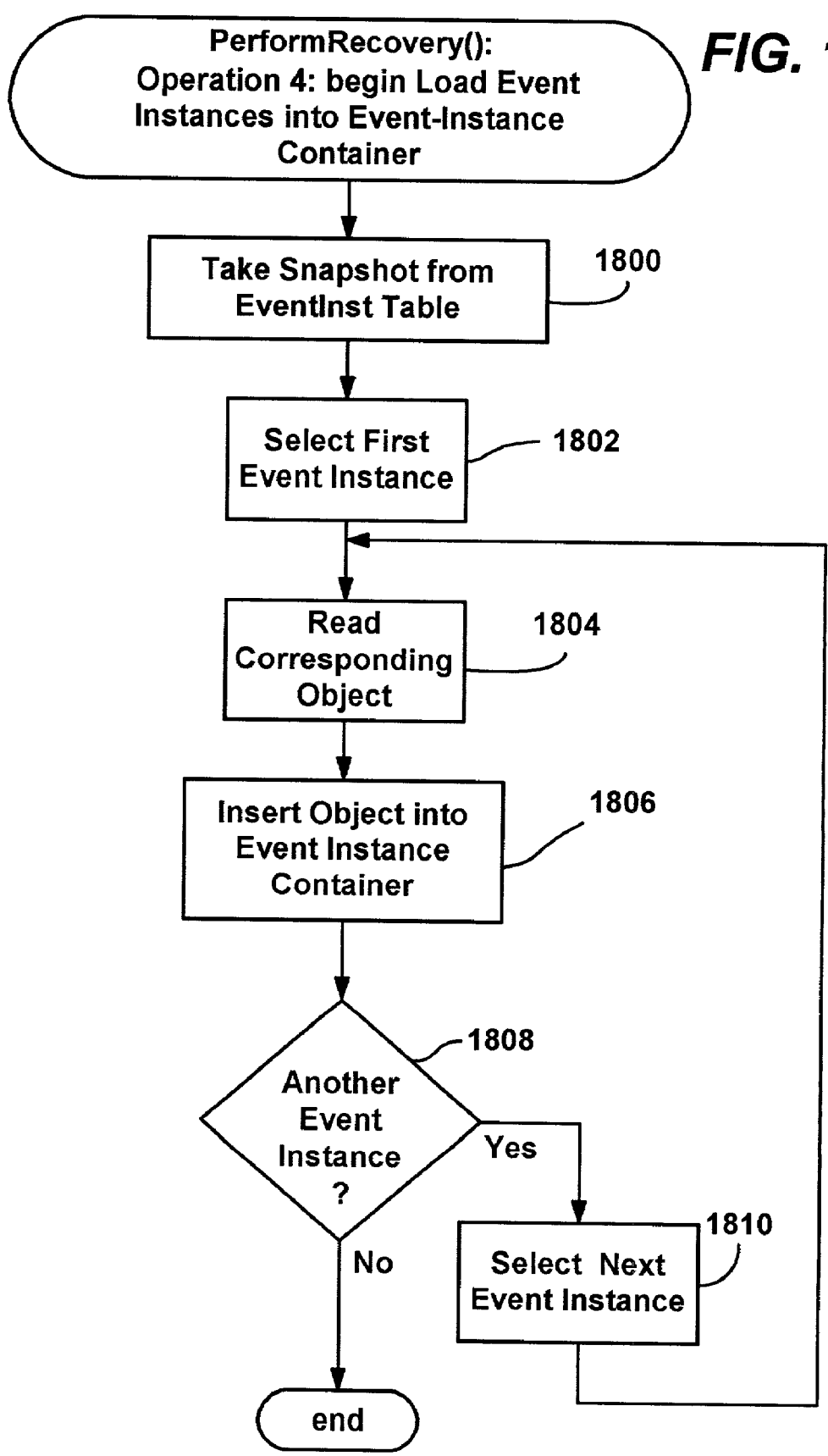

A fourth operation of PerformRecovery( ), Operation 4, loads event instances (e.g., general or job event instances) into an event-instance container, as generally represented in FIG. 18 beginning at step 1800. To accomplish this, at step 1800 a snapshot is taken from the EventInst table. For each event instance, (repeated via steps 1802, 1808 and 1810), the corresponding object is read (step 1804) and the object is inserted into the event instance container (step 1806).

Lastly, for every event instance in the event instance container, the RouteEvent( ) function is applied, as described above with reference to FIGS. 11-14. As described above, the Eval( ) function of FIG. 12A checks that the Event Instance Receive time is greater than the DNF Reset time, and if so, the Eval function continues with the current DNF and the current event instance, otherwise, Eval returns. Note, however, that during recovery, the event instance is not persisted, and there is no ev-inst-msg to receive from the queue. It should be noted that the trigger engine was designed such that the recovery path and the normal path are nearly identical, as this stimulates the implementation quality and stability of the system.

Access Control

The trigger engine design allows powerful and detailed access-control capability. As represented herein, the access checks are performed by step 1203 (FIG. 12). This step is optional, and if access-control is not needed it can be degenerated by skipping the access checks and pretending as if they were successful. Two conceptual checks are performed, namely whether the Event-Instance may trigger this DNF, and whether this DNF may receive this Event-Instance.

Access checking requires a securable object that has an attached specification that tells who may access it, and an ID that identifies the entity that wishes to access the securable object. In the case of the trigger engine, both the DNF (which is comprised of Atoms) and the Event-Instance are securable objects and identifiable objects. The job to which the DNF relates may have an access-list entry that specifies who may trigger it. This mechanism secures the job from being started by unauthorized computer accounts that represent users who do not have permission to trigger such jobs.

A job also may have an access-list entry that grants access to those users that may receive events created by its processing. This mechanism ensures that only those users that are allowed to get notification about a certain job will have access to the related events. Similarly, the commonly used file system ACLs (access control lists) can be extended or leveraged to define who may receive related events (e.g., receive permission is equivalent to read permission).

User IDs are defined as follows: when a job is processed and executing, it is done in the context of a user account. This account may be associated with a human being, a company department that "owns" the job, or a corporate operations center. Every job has such an account (explicitly specified by the job author, or implicitly defined, e.g., as the job author account). The ID of this account can be used in both access checks as follows: the account ID of the event instance is inherited from the job to which the event relates. When step 1203 (FIG. 12) verifies that an event is allowed to trigger a job, it matches this account ID against the job access-list.

The receiving job also has an account under which it will be processed and execute. This is used in step 1203, by matching it against the Event-Instance access control list that specifies who may consume it. Other events can be extended similarly. For instance, the user ID associated with file related events may be the file originating account.

To summarize, the above definitions and mechanisms allow the job authors to control per job who may trigger it and who may consume events that relate to it.

As can be seen from the foregoing detailed description, there is provided a method and system for handling event registration and propagation in a distributed enterprise in a reliable and secure manner. The system and method are efficient and scalable to large networks, making the present invention suitable for use with batch systems in a large-scale enterprise network.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A system for notifying clients of job-related event instances, comprising:

a first trigger engine, implemented in a first computing device of the system, configured to register event requests, including a first event request from a first client and a second event request from a second client, and to combine the first event request and the second event request into a single base event request;

a second trigger engine, implemented in the first computing device or a second computing device of the system, configured to communicate with the first trigger engine to receive a registration of the single base event request at the second trigger engine, the first trigger engine being configured to not communicate the first event request and the second event request to the second trigger engine in order to reduce a number of events to be remotely communicated, and the second trigger engine being further configured to receive notification of an event instance corresponding to a base event occurring at an event source; and upon receipt of the notification of the event instance, the second trigger engine communicating data indicative of the event instance to the first trigger engine, the first trigger engine being configured to determine to which of the first event request and the second event request the event instance corresponds, wherein if the event instance corresponds to the first event request, then the first trigger engine notifies the first client of the event instance, and wherein if the event instance corresponds to the second event request, then the first trigger engine notifies the second client of the event instance.

2. The system of claim 1 wherein the data indicative of the event instance is provided in an event object.

3. The system of claim 1 wherein the first trigger engine and the second trigger engine are each a proxy of a switchbox component.

4. The system of claim 1 wherein the first trigger engine and the second trigger engine communicate over a network connection.

5. The system of claim 1 wherein the first trigger engine has a least one data structure for determining which ones of the event requests correspond to particular base event requests.

6. The system of claim 1 wherein the first trigger engine is a client of the second trigger engine, and wherein the second trigger engine has a least one data structure for determining which ones of the event requests correspond to particular event instances.

7. The system of claim 1 wherein at least one of the first event request or the second event request corresponds to a job.

8. The system of claim 7 wherein the first trigger engine is associated with a job scheduler component.

9. The system of claim 7 wherein the second trigger engine is associated with a job dispatcher component.

10. The system of claim 1 wherein the first trigger engine is associated with a job scheduler component, and wherein the job scheduler component includes at least one data structure for maintaining information corresponding to event-triggered criteria for a pending job.

11. The system of claim 10 wherein the event-triggered criteria include a time event.

12. The system of claim 10 wherein the event-triggered criteria include a job event corresponding to a completion status of at least one other job.

13. The system of claim 12 wherein the event-triggered criteria are arranged as clauses of atoms, each of the atoms corresponding to a request.

14. The system of claim 1 wherein the first trigger engine communicates with the second trigger engine via a reliable protocol.

15. The system of claim 1 wherein the first trigger engine communicates with the second trigger engine via a message queuing service.

16. The system of claim 1 wherein at least one of the first trigger engine or the second trigger engine includes a recovery process.

17. The system of claim 1 wherein at least one of the first event request or the second event request corresponds to a job, and wherein the first trigger engine is hosted by a job scheduler component.

18. The system of claim 1 further comprising an access checking mechanism.

19. In a computer network, a method for notifying clients of events, comprising:

receiving, at a first trigger engine, of a first computing device, a first event request from a first client, the first event request corresponding to a first event on a remote server, the first event request including information specific to the first event request;

receiving, at the first trigger engine, a second event request from a second client, the second event request corresponding to a second event on the remote server, the second request including information specific to the second event request;

maintaining, at the first trigger engine, information specific to each of the first event request and the second event request;

combining, at the first trigger engine, the first event request and the second event request into a single base event request;

registering, by the first trigger engine, the single base event request and not the first event request and the second event request at a second trigger engine of the remote server in order to reduce a number of events remotely communicated;

receiving, by the first trigger engine from the second trigger engine, notification of an instance of a base event, the notification including event-specific information about the instance of the base event;

analyzing, by the first trigger engine, the event-specific information to determine to which of the first event request and the second event request the instance of the base event corresponds;

notifying, by the first trigger engine, the first client if the event-specific information corresponds to the information specific to the first event request; and notifying, by the first trigger engine, the second client if the event-specific information corresponds to the information specific to the second event request.

20. The method of claim 19 further comprising running a job in response to receiving a notification at the first client.

21. The method of claim 19 further comprising, maintaining criteria for running a job, determining if a notification received by the first client satisfies the criteria, and if so, running the job.

22. The method of claim 21 wherein running the job includes providing job information to a job dispatcher.

23. The method of claim 21 wherein the job dispatcher causes the job to be run on an agent.

24. The method of claim 23 further comprising, receiving event information corresponding to completion of the job.

25. The method of claim 24 further comprising running another job upon receipt of the event information corresponding to the completion of the job.

26. The method of claim 19 further comprising running a recovery process.

27. The method of claim 26 wherein the recovery process comprises a series of operations.

28. The method of claim 19 further comprising performing at least one access check.

* * * * *